United States Patent
Srinivasan et al.

(10) Patent No.: US 10,990,286 B1
(45) Date of Patent: Apr. 27, 2021

(54) PARALLEL UPGRADE OF NODES IN A STORAGE SYSTEM

(71) Applicant: EMC IP Holding Company LLC, Hopkinton, MA (US)

(72) Inventors: Vijay Srinivasan, Bangalore (IN); Trupti R. Ghate, Pune (IN); Nayana Lingraj, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 9 days.

(21) Appl. No.: 16/668,770

(22) Filed: Oct. 30, 2019

(51) Int. Cl.
*G06F 3/06* (2006.01)
*G06F 11/07* (2006.01)

(52) U.S. Cl.
CPC ............ *G06F 3/0607* (2013.01); *G06F 3/067* (2013.01); *G06F 3/0659* (2013.01); *G06F 11/0727* (2013.01)

(58) Field of Classification Search
CPC .... G06F 3/0607; G06F 11/0727; G06F 3/067; G06F 3/0659
See application file for complete search history.

(56) References Cited

U.S. PATENT DOCUMENTS

| | | | |
|---|---|---|---|
| 7,444,464 B2 | 10/2008 | Urmston et al. | |
| 8,095,726 B1 | 1/2012 | O'Connell et al. | |
| 8,214,612 B1 | 7/2012 | Natanzon | |
| 8,301,593 B2 | 10/2012 | Hoffmann et al. | |
| 9,104,326 B2 | 8/2015 | Frank et al. | |
| 9,208,162 B1 | 12/2015 | Hallak et al. | |
| 9,286,003 B1 | 3/2016 | Hallak et al. | |
| 9,552,258 B2 | 1/2017 | Hallak et al. | |
| 9,606,870 B1 | 3/2017 | Meiri et al. | |
| 9,716,754 B2 | 7/2017 | Swift | |
| 9,740,472 B1 * | 8/2017 | Sohi | G06F 8/65 |
| 10,176,046 B1 | 1/2019 | Hu et al. | |
| 10,261,693 B1 | 4/2019 | Schneider et al. | |

(Continued)

FOREIGN PATENT DOCUMENTS

WO 2016111954 A1 7/2016

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Michelle T Bechtold
(74) *Attorney, Agent, or Firm* — Ryan, Mason & Lewis, LLP

(57) ABSTRACT

An apparatus comprises a processing device that is configured to identify first and second subsets of nodes in a plurality of nodes, the first subset of nodes having dependencies with a first node in the plurality of nodes and the second subset of nodes having dependencies with a second node in the plurality of nodes. The processing device is configured to select the first node for an upgrade and to determine that the second node is not included in the first subset. The processing device is configured to determine that the first node is not included in the second subset and to upgrade the first and second nodes at least partially in parallel based at least in part on the determination that the second node is not included in the first subset and the determination that the first node is not included in the second subset.

20 Claims, 11 Drawing Sheets

(56) References Cited

U.S. PATENT DOCUMENTS

| | | | |
|---|---|---|---|
| 10,324,640 | B1 | 6/2019 | Chen et al. |
| 10,338,851 | B1 | 7/2019 | Kronrod et al. |
| 10,359,965 | B1 | 7/2019 | Stronge et al. |
| 10,394,485 | B1 | 8/2019 | Chen et al. |
| 10,437,501 | B1 | 10/2019 | Kucherov et al. |
| 10,437,855 | B1 | 10/2019 | Stronge et al. |
| 2008/0279462 | A1 | 11/2008 | Celi, Jr. |
| 2009/0132955 | A1 | 5/2009 | Garg et al. |
| 2010/0179941 | A1 | 7/2010 | Agrawal et al. |
| 2011/0099266 | A1* | 4/2011 | Calder ................ G06F 8/65 709/224 |
| 2013/0325824 | A1 | 12/2013 | Shoens |
| 2014/0181016 | A1 | 6/2014 | Whitehead et al. |
| 2015/0378785 | A1 | 12/2015 | Tarasuk-Levin et al. |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2017/0192857 | A1 | 7/2017 | Meiri et al. |
| 2017/0366619 | A1* | 12/2017 | Schreter .............. H04L 41/0654 |
| 2019/0303490 | A1 | 10/2019 | Chen et al. |

OTHER PUBLICATIONS

EMC Corporation, "Unstoppable Data Reduction: Always-on, In-Line, Zero-Penalty, Enterprise-Class, Free,"https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Protection (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

Dell EMC, "PowerMax OS," Dell EMC PowerMax Family Product Guide, May 2019, 192 pages.

U.S. Appl. No. 15/793,121 filed in the name of David Meiri et al. on Oct. 25, 2017 and entitled "Opportunistic Compression of Replicated Data in a Content Addressable Storage System."

U.S. Appl. No. 15/819,666 filed in the name of Xiangping Chen et al. on Nov. 21, 2017 and entitled "Storage System Configured for Controlled Transition between Asynchronous and Synchronous Replication Modes."

U.S. Appl. No. 15/824,536 filed in the name of Christopher Sayles et al. on Nov. 28, 2017 and entitled "Storage System with Asynchronous Messaging between Processing Modules for Data Replication."

U.S. Appl. No. 16/037,050 filed in the name of Ying Hu et al. on Jul. 17, 2018 and entitled "Storage System with Multiple Write Journals Supporting Synchronous Replication Failure Recovery."

U.S. Appl. No. 16/253,793 filed in the name of Yuval Harduf et al. on Jan. 22, 2019 and entitled "Storage System with Data Consistency Checking in Synchronous Replication Using Active Snapshot Set."

U.S. Appl. No. 16/396,897 filed in the name of Anton Kucherov et al. on Apr. 29, 2019 and entitled System with "Storage System Deduplication-Aware Replication Implemented Using a Standard Storage Command Protocol."

U.S. Appl. No. 16/413,050 filed in the name of Xiangping Chen et al. on May 15, 2019 and entitled "Storage System with Coordinated Recovery across Multiple Input-Output Journals of Different Types."

U.S. Appl. No. 16/265,131 filed in the name of Lior Kamran et al. on Feb. 1, 2019 and entitled "Storage System with Write Cache Release Protection."

U.S. Appl. No. 15/793,147 filed in the name of Ernesto Blanco et al. on Oct. 25, 2017 and entitled "Compression Signaling for Replication Process in a Content Addressable Storage."

U.S. Appl. No. 15/662,708 filed in the name of Xiangping Chen et al. on Jul. 28, 2017 and entitled "Token-Based Data Flow Control in a Clustered Storage System."

* cited by examiner

US 10,990,286 B1

PARALLEL UPGRADE OF NODES IN A STORAGE SYSTEM

FIELD

The field relates generally to information processing systems, and more particularly to upgrading components of information processing systems.

BACKGROUND

In some cases, a storage system utilizes a storage array having a storage layout that comprises primary and backup nodes. During the preparation for an upgrade in an upgrade process, the functionality of the storage array is typically moved from the primary node to the backup node while the primary node is being upgraded or vice versa. However, such a serial upgrade of the nodes of a storage array may be inefficient, especially where the storage layout comprises additional nodes.

SUMMARY

Illustrative embodiments provide techniques for upgrading nodes in a storage system. For example, in one embodiment, an apparatus comprises at least one processing device comprising a processor coupled to a memory. The at least one processing device is configured to identify a first subset of nodes in a plurality of nodes of a storage system. The first subset of nodes comprises nodes having dependencies with a first node in the plurality of nodes. The at least one processing device is further configured to identify a second subset of nodes in the plurality of nodes. The second subset of nodes comprises nodes having dependencies with a second node in the plurality of nodes. The at least one processing device is further configured to select the first node for an upgrade and to determine that the second node is not included in the first subset of nodes. The at least one processing device is further configured to determine that the first node is not included in the second subset of nodes and to upgrade the first and second nodes at least partially in parallel based at least in part on the determination that the second node is not included in the first subset of nodes and the determination that the first node is not included in the second subset of nodes.

In some embodiments, the at least one processing device is further configured to determine that the first node comprises an active deployment container that is configured to manage upgrades for the plurality of nodes and to determine that the first node was selected for the upgrade. The at least one processing device is further configured to identify a given node of the plurality of nodes that is not selected for the upgraded and to activate a deployment container on the given node. The at least one processing device is further configured to disable the deployment container on the first node.

In an embodiment, the upgrading is performed based at least in part on an upgrade package comprising a plurality of components to be upgraded. The at least one processing device is further configured to obtain a plurality of deployment manifests associated with the plurality of components. Each deployment manifest comprises an indication of at least one health check associated with a corresponding component to be performed as part of the upgrade. The at least one processing device is further configured to aggregate the obtained deployment manifests into a health deployment manifest. The health deployment manifest comprises a combined list of health checks based at least in part on the indication included in each deployment manifest. The at least one processing device is further configured to perform at least one health check based at least in part on the health deployment manifest.

In another embodiment, a given node in the plurality of nodes is configured to service a plurality of clusters. The at least one processing device is further configured to associate each of the clusters with a separate state machine for the given node. Each state in the state machine is associated with a given cluster corresponding to a component to be upgraded on the given node for that cluster. Responsive to a detection of an error during an upgrade of a component of the given cluster on the given node, the at least one processing device is further configured to revert the upgrade of the given cluster to a predetermined component of the given cluster based at least in part on the state machine associated with the given cluster. The at least one processing device is further configured to restart the upgrade of the given cluster on the given node from the predetermined component of the given cluster.

Other embodiments can combine features and functionality of two or more of the above embodiments.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
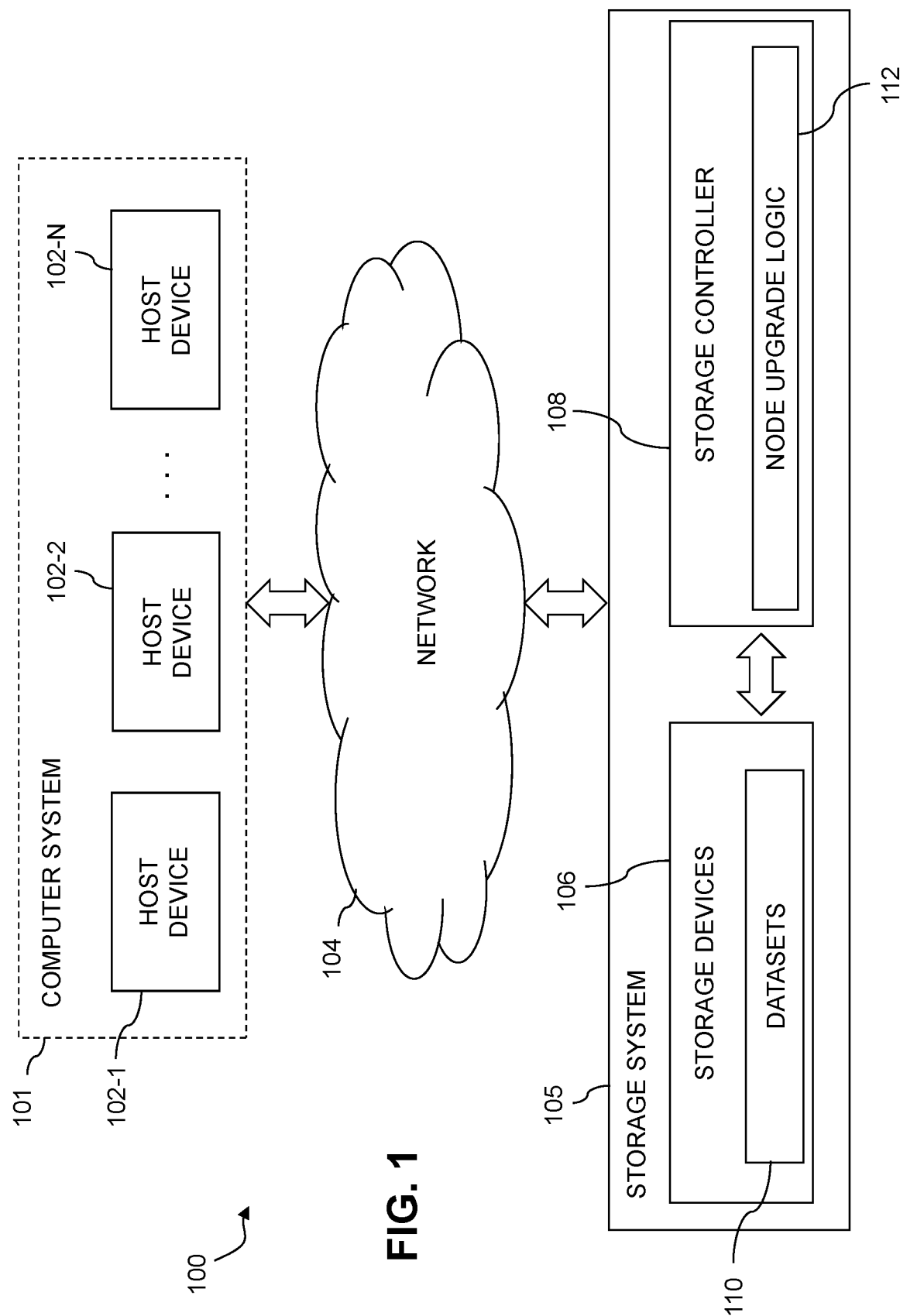
FIG. 1 is a block diagram of an information processing system comprising a storage system configured with node upgrade functionality in an illustrative embodiment.

FIG. 1 shows an information processing system 100 configured in accordance with an illustrative embodiment. The information processing system 100 comprises a computer system 101 that includes host devices 102-1, 102-2, . . . 102-N. The host devices 102 communicate over a network 104 with a storage system 105. The computer system 101 is assumed to comprise an enterprise computer system, cloud-based computer system or other arrangement of multiple compute nodes associated with respective users. The host devices 102 of the computer system 101 in some embodiments illustratively provide compute services such as execution of one or more applications on behalf of each of one or more users associated with respective ones of the host devices 102.

The host devices 102 and storage system 105 illustratively comprise respective processing devices of one or more processing platforms. For example, the host devices 102 and the storage system 105 can each comprise one or more processing devices each having a processor and a memory, possibly implementing virtual machines and/or containers, although numerous other configurations are possible.

The host devices 102 and the storage system 105 can additionally or alternatively be part of cloud infrastructure such as an Amazon Web Services (AWS) system. Other examples of cloud-based systems that can be used to provide one or more of host devices 102 and storage system 105 include Google Cloud Platform (GCP) and Microsoft Azure.

The host devices 102 and the storage system 105 may be implemented on a common processing platform, or on separate processing platforms.

The host devices 102 are configured to write data to and read data from the storage system 105 in accordance with applications executing on those host devices 102 for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 105 is accessible to the host devices 102 over the network 104. The storage system 105 comprises a plurality of storage devices 106 and an associated storage controller 108. The storage devices 106 store datasets 110, which may comprise logical storage volumes, snapshots or other arrangements of data.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random-access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the storage system 105 illustratively comprises a scale-out all-flash content addressable storage array such as an XtremIO™ storage array from Dell EMC. Other types of storage arrays, including by way of example VNX®, Symmetrix VMAX® and PowerMAX® storage arrays also from Dell EMC, can be used to implement storage system 105 in other embodiments.

The term "storage system" as used herein is therefore intended to be broadly construed and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage system 105 in illustrative embodiments include all-flash and hybrid flash storage arrays such as Unity™ software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The storage controller 108 of storage system 105 in the FIG. 1 embodiment includes node upgrade logic 112 which is configured to implement node upgrade functionality for upgrading nodes of the storage array in a parallel or semi-parallel manner. In illustrative embodiments, semi-parallel refers to an upgrade of nodes in multiple serial passes where one or more of the passes may comprise multiple nodes being upgraded in parallel. The storage system 105 should also be understood to include additional modules and other components typically found in conventional implementations of storage systems, although such additional modules and other components are omitted from the figure for clarity and simplicity of illustration.

The host devices 102 and the storage system 105 may be implemented on respective distinct processing platforms, although numerous other arrangements are possible. For example, in some embodiments at least portions of the host devices 102 and the storage system 105 are implemented on the same processing platform. The storage system 105 can therefore be implemented at least in part within at least one processing platform that implements at least a portion of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and storage system 105 to reside in different data centers. Numerous other distributed implementations of one or both of the host devices 102 and the storage system 105 are possible. Accordingly, the storage system 105 can also be implemented in a distributed manner across multiple data centers.

Additional examples of processing platforms utilized to implement host devices and/or storage systems in illustrative embodiments will be described in more detail below in conjunction with FIGS. 9-11.

It is to be appreciated that these and other features of illustrative embodiments are presented by way of example only and should not be construed as limiting in any way.

Accordingly, different numbers, types and arrangements of system components such as host devices 102, network 104, storage system 105, storage devices 106, storage controller 108, datasets 110 and node upgrade logic 112 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in other embodiments, functionality for the node upgrade logic can be implemented in the storage system, in one or more host devices, or partially in a host device and partially in a storage system. Accordingly, illustrative embodiments are not limited to arrangements in which all such functionality is implemented in a storage system or a host device, and therefore encompass various hybrid arrangements in which the functionality is distributed over one or more storage systems and one or more associated host devices, each comprising one or more processing devices.

The next-generation storage array comprises a multi-node, internally multi-cluster storage array, which is configured to utilize a data cluster network-attached storage (NAS) configuration which is scalable up to sixteen nodes as compared to existing storage systems which only have two nodes, e.g., a primary node and a backup node. The storage array may also be configured to include a cross-cluster or unified replication model allowing the data cluster NAS to further scale beyond 16 nodes. In illustrative embodiments, techniques are disclosed which enable a non-disruptive upgrade (NDU) of nodes that is semi-parallel with a distributed master, adaptive health and compatibility checks and, in case of upgrade failure, a recovery function that is independent and tolerant to a local node-level and cluster-level consistency.

The next-generation storage array comprises a collection of multiple, cohesive, highly decoupled clusters residing on nodes that comprise, for example, NAS container clusters, base platform clusters, management clusters, database clusters, deployment near-clusters, external management clusters or any other clusters. The external management clusters may be utilized for user interface (UI) and representation state transfer (REST) purposes. The storage array 105 may comprise one or more of any of the above-mentioned clusters or any other clusters.

In some cases, a storage array utilizes a storage layout that maximizes the overall logical volume accesses and masks a virtual NAS server logical volume and its associated file systems to only its primary and backup nodes. Because only primary and backup nodes are used, during the preparation for an upgrade in a non-disruptive upgrade (NDU) process, the NAS servers typically can only be moved from the primary node to the backup node while the primary node is being upgraded or vice versa. Due to this dual node storage layout, any attempt to utilize parallelization in the upgrade process needs to account for each of the NAS server's primary and backup nodes before deriving the node selections for an upgrade.

In addition, the primary node is often designated as both a control master and a deployment master for an upgrade by default. When an NDU process is triggered, for example, by a management console, the NDU process is often orchestrated through a deployment container within the storage array cluster. However, as part of the upgrade, the node on which the deployment container is actively operating, e.g., the primary node in this case, also referred to herein as the deployment master, and the deployment container itself may also need to be upgraded. Since the deployment process may be monitored continuously and the status of the upgrade needs to be reported or acknowledged, the deployment container needs to be activated on another node while the primary node is upgraded.

In some embodiments, the upgrade process itself may comprise a full upgrade, e.g., an upgrade of all the nodes or clusters, or a partial upgrade, e.g., upgrade a subset of the nodes or clusters. In a partial upgrade, for example, the base OS cluster, management path cluster, database cluster, NAS cluster or any other cluster or node of the storage array may be selectively upgraded or a patch may be deployed to selectively upgrade some portion of the storage array.

Typically, as part of an upgrade process a health check is performed on all of the components of the storage array regardless of how much the upgrade impacts the storage array, which can introduce unnecessary delays in the storage array. In some embodiments, there may be a benefit in performing only selective health checks in situations where a partial upgrade is performed when that upgrade does not have a wide impact on the storage array as a whole or does not have many dependencies to the other components of the storage array. In addition, in the event of an error and recovery during an upgrade, the use of a selective and dynamic set of health checks that is bound to the upgraded components may offer increased efficiency for the storage array as compared to a generic health check of the whole system.

In illustrative embodiments, the NDU process performs upgrades at the node-level. For example, the participating cluster components that are on the target node for the upgrade will go through the upgrade in either a serial or a parallel manner based on dependencies. In addition, a failure to a given component in a given cluster during an upgrade does not impact the upgrade of the components of different clusters residing on the node. Where the storage array is an enterprise platform, to ensure minimal disruptions and a better-field experience, it may also be beneficial to recover the failed component to a well-known previous state from which the upgrade can be recovered with a manual or automated set of diagnostics.

In a storage array, there are also various health checks that may be performed on the system to determine the health status of the cluster components and the platform. However, such health checks typically do not guarantee that the inter-component functionalities function as desired. While the qualification processes largely ensure that the upgrade package is qualified for a user's configuration, an integrated, composite compatibility check across the system, especially to the control path can ensure an upgrade-safe configuration. In a similar manner to how a pre-upgrade health check can be utilized prior to an upgrade to ensure that the system is ready for an upgrade, a compatibility health check along with a post-upgrade health check may be utilized in some embodiments to ensure a safe-upgrade configuration for the users.

Figure 2:
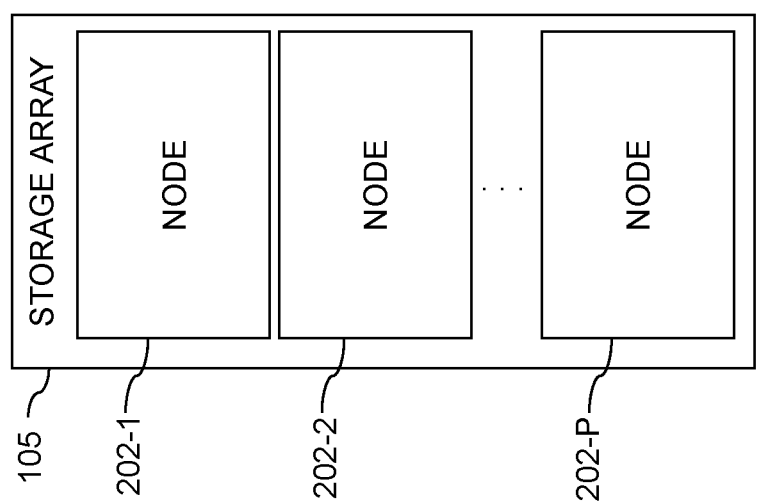
FIG. 2 is a block diagram of an example storage array configuration of the storage array of FIG. 1 comprising a plurality of nodes configured with the node upgrade functionality in an illustrative embodiment.

With reference now to FIG. 2, in illustrative embodiments, the storage array 105 comprises a configuration of nodes 202 which may be utilized for implementing the above described storage array clusters. For example, as seen in FIG. 2, storage array 105 comprises nodes 202-1, 202-2 ... 202-P.

Figure 3:
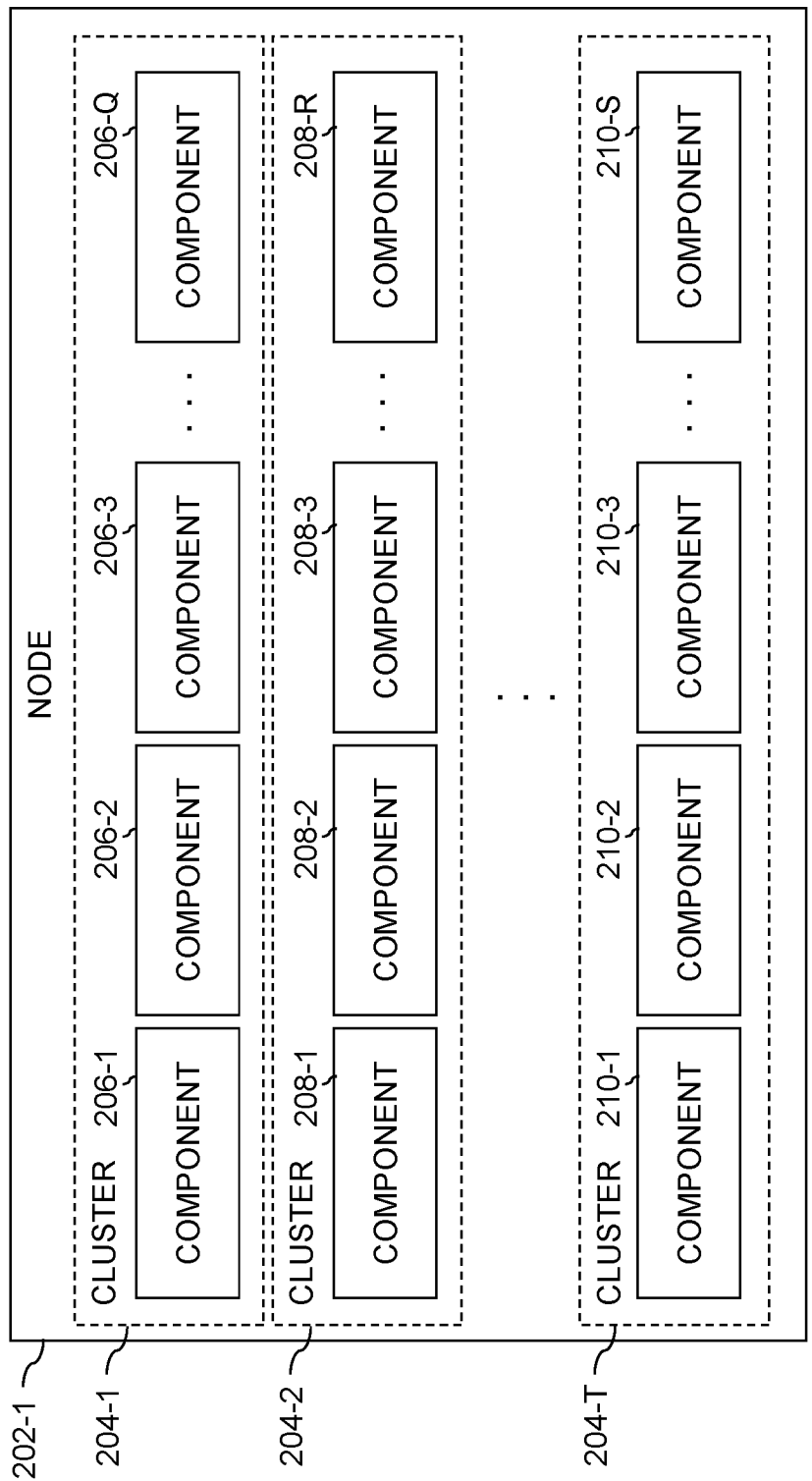
FIG. 3 is a block diagram of an example node of the storage array of FIG. 2 comprising a plurality of components arranged in clusters in an illustrative embodiment.

In some embodiments, the nodes 202 comprise some or all of the components of one or more clusters 204. For example, as seen in the example of FIG. 3, node 202-1 comprises components 206-1, 206-2, 206-3 ... 206-Q for cluster 204-1, components 208-1, 208-2, 208-3 ... 208-R for cluster 204-2 ... and components 210-1, 210-2, 210-3 ... 210-S for cluster 204-T. In some embodiments, other components of the clusters 204-1, 204-2 ... 204-T may reside on other nodes 202. For example, the components of a given cluster may be split across multiple nodes or multiple nodes may comprise at least some components of a given cluster that are the same for example to function as a primary or backup node for those components of the cluster.

Illustrative embodiments of the disclosed node upgrade functionality will now be described in more detail. The node upgrade functionality may be implemented by node upgrade logic 112 residing on storage array 105 as shown in FIG. 1.

As part of the start of an NDU process, node upgrade logic 112 makes the following assessments:

a. Whether the upgrade is a full or partial upgrade.

b. Whether all of the nodes or only a select group of the nodes are required for the upgrade.

c. Whether all of the components or only a select group of the components are required for the upgrade.

Based at least in part on these assessments, the node upgrade logic 112 generates a directed graph based at least in part on the cluster's primary and secondary nodes and defines the various passes for upgrades that will execute in parallel, when there is more than one node. For example, in some embodiments, the nodes that will be included in the various passes may be determined according to the following example pseudocode:

Upgrade_pass_list=dictionary(n, list(nodes)), where n is a non-zero integer.
Discard_list=dictionary(n, list(nodes))
For each node,
    For each NAS Server,
    Create a directed graph of all backup nodes.
Set n=1
For each node,
    If upgrade_pass_list is empty,
    Add the node for 'n'.
    Place all the backup nodes to the discard_list for 'n'.
    Else If upgrade_pass_list is not empty,
    Check if the current node is already in the existing upgrade_pass_list. If yes, skip this node.
    Check if the current node is in discard_list for the current 'n'.
    If not present,
        Check if any of the backup node is present in the upgrade_pass_list(nodes) for 'n'.
        If yes,
            add the current node to discard_list for 'n'.
        Else,
            Add the current node to upgrade_pass_list for 'n'
Increment 'n'

In a complex node configuration, for example, 'n' may be equal to the total number of nodes that are used by a given cluster being upgraded. In a scenario where the node configuration comprises only a primary node and a backup node, 'n' may be equal to two and the upgrade would be sequential. In a scenario where there are additional nodes, some of the nodes may run the NDU in parallel according to their respective dependencies.

In the following example upgrade selection processes that may be performed by node upgrade logic 112 for selecting nodes 202 for an upgrade, the storage array 105 comprises a set of 4 nodes {1, 2, 3, 4}. In each of the following examples A through C below, the dependencies D for each node are denoted by the format node #→{$D_1, D_2 \ldots D_N$}.

Example A: 1→{2, 3}, 2→{4}, 3→{1}, 4→{2}
      i. Pass 1—{1, 4}
      ii. Pass 2—{2, 3}

As can be seen in example A, node 1 has nodes 2 and 3 as dependencies, node 2 has node 4 as a dependency, node 3 has node 1 as a dependency and node 4 has node 2 as a dependency.

Using the upgrade selection process of node upgrade logic 112 described above, node 1 is initially added to the upgrade_pass_list for pass 1 and then due to their dependencies from node 1, nodes 2 and 3 are added to the discard_list. Since node 4 does not depend from node 1 or have node 1 as a dependency, node 4 is also added to the upgrade_pass_list for pass 1. The upgrade selection process similarly selects nodes for upgrading in one or more subsequent passes. As seen in example A, the upgrade is broken into two passes to provide a semi-parallel upgrade, pass 1, which upgrades nodes 1 and 4 in parallel followed by pass 2 which upgrades nodes 2 and 3 in parallel. Note that nodes 2 and 3 can also be upgraded in parallel since they do not have any co-dependencies.

Example B: 1→{2, 3}, 2→{1}, 3→{1, 2}, 4→{3}
  i. Pass 1—{1, 4}
  ii. Pass 2—{2}
  iii. Pass 3—{3}

As can be seen in example B, node 1 has nodes 2 and 3 as dependencies, node 2 has node 1 as a dependency, node 3 has nodes 1 and 2 as dependencies and node 4 has node 3 as a dependency.

Using the upgrade selection process of node upgrade logic 112 described above, node 1 is initially added to the upgrade_pass_list for pass 1 and then due to their dependencies from node 1, nodes 2 and 3 are added to the discard_list. Since node 4 does not depend from node 1 or have node 1 as a dependency, node 4 is also added to the upgrade_pass_list for pass 1. The upgrade selection process similarly selects nodes for upgrading in one or more subsequent passes. For example, as seen in example B, the upgrade is broken into three passes to provide a semi-parallel upgrade, pass 1, which upgrades nodes 1 and 4 in parallel followed by pass 2 which upgrades node 2 and then pass 3 which upgrades node 3. Note that since node 3 has node 2 as a dependency in this example, they must be upgraded serially in separate passes.

Example C: 1→{2, 3}, 2→{1, 3}, 3→{2, 4}, 4→{1, 2}
  i. Pass 1—{1}
  ii. Pass 2—{2}
  iii. Pass 3—{3}
  iv. Pass 4—{4}

As can be seen in example C, above, node 1 has nodes 2 and 3 as dependencies, node 2 has nodes 1 and 3 as dependencies, node 3 has nodes 2 and 4 as dependencies and node 4 has nodes 1 and 2 as dependencies.

Using the upgrade selection process of node upgrade logic 112 described above, node 1 is initially added to the upgrade_pass_list for pass 1 and then due to their dependencies from node 1, nodes 2 and 3 are added to the discard_list. Since node 4 includes node 1 as a dependency, node 4 is also added to the discard_list. The upgrade selection process similarly selects nodes for upgrading in one or more subsequent passes. For example, as seen in example C, the upgrade is broken into four passes to provide a serial upgrade comprising pass 1 which upgrades node 1 followed by pass 2 which upgrades node 2 followed by pass 3 which upgrades node 3 and finally pass 4 which upgrades node 4. Note that due to the nature of the dependencies between nodes 1 through 4 in this example, the upgrade process must be performed serially in separate passes.

Figure 4:
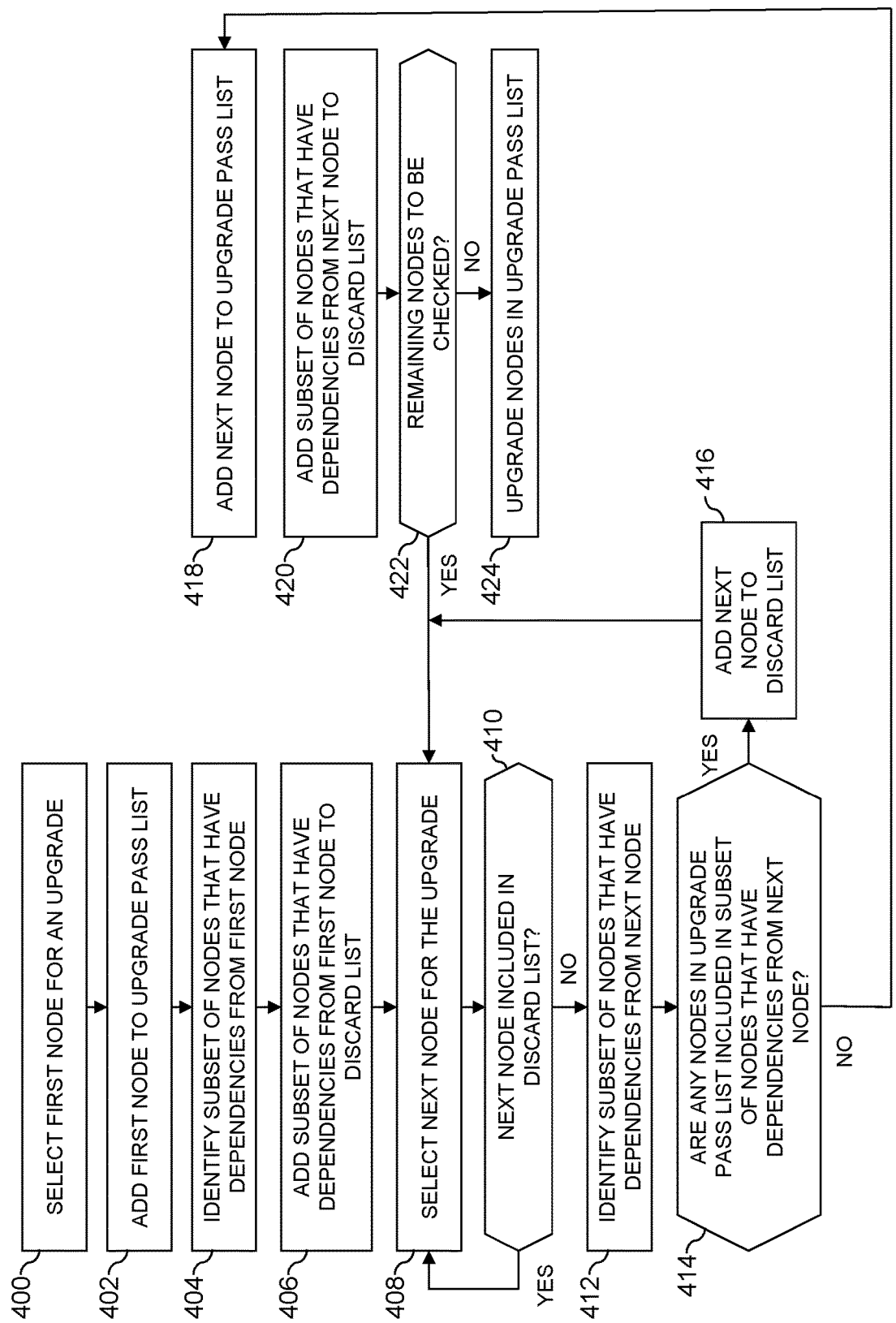
FIG. 4 is a flow diagram of an example process for upgrading nodes of the storage array according to the node upgrade functionality in an illustrative embodiment.

The operation of node upgrade logic 112 for the upgrade selection process will now be described in further detail with reference to the flow diagram of the illustrative embodiment of FIG. 4. The process as shown in FIG. 4 includes steps 400 through 424. The steps of FIG. 4 are illustratively performed at least in part under the control of one or more processing devices the storage array 105.

At step 400, node upgrade logic 112 selects a first node for an upgrade.

At step 402, node upgrade logic 112 adds the first node to the upgrade_pass_list.

At step 404, node upgrade logic 112 identifies a subset of nodes that have dependencies from the first node, for example, as described above in examples A, B and C.

At step 406, node upgrade logic 112 adds the identified subset of nodes that have dependencies from the first node to the discard_list, as described above.

At step 408, node upgrade logic 112 selects the next node for the upgrade. For example, the next node may be node 2 in example A above.

At step 410, node upgrade logic 112 determines whether or not the next node is included in the discard_list. If the next node is included in the discard_list, the process returns to step 408 and the next node is selected for the upgrade. If the next node is not included in the discard_list, the process proceeds to step 412.

With reference to example A, above, if node 1 was selected as the first node and added to the upgrade_pass_list, nodes 2 and 3 would be added to the discard_list since they have dependencies from node 1. If node 2 were then selected as the next node at step 408, node upgrade logic 112 would determine that node 2 is included in the discard_list, e.g., because it is in the subset of nodes that depend from node 1, and the process would return to step 408 to select the next node. The same process would occur if node 3 was selected as the next node since it is also included in the subset of nodes that are dependent on node 1. However, when node 4 is selected as the next node, node upgrade logic 112 would determine that node 4 is not included in the discard_list and the process would proceed to step 412.

At 412, node upgrade logic 112 identifies a subset of nodes that have dependencies from the next node for example, as described above.

At 414, node upgrade logic 112 determines whether or not any nodes in the upgrade_pass_list are included in the subset of nodes that have dependencies from the next node. If a node in the upgrade_pass_list is included in the subset of nodes that have dependencies from the next node, the next node is added to the discard_list at step 416 and the process returns to step 408. For example, as seen in example C, above, while node 4 is not included in the subset of nodes that have dependencies from the first node, node 1 is included in the subset of nodes that have dependencies from node 4. In this case node 4 will also be added to the discard_list at step 416.

Referring again to step 414, if none of the nodes in the upgrade_pass_list are included in the subset of nodes that have dependencies from the next node, the next node is added to the upgrade_pass_list at 418. Referring again to example A, described above, since only node 1 is included in the upgrade_pass_list and the subset of nodes that have dependencies from node 4 do not include node 1, node 4 is added to the upgrade_pass_list.

At 420, node upgrade logic 112 adds the subset of nodes that have dependencies from the next node to the discard_list.

At 422, node upgrade logic 112 determines whether or not there are any remaining nodes to be checked for addition to the upgrade_pass_list or discard_list. If there are more nodes to be checked, the process returns to step 408. If no nodes are remaining to the checked, the process proceeds to step 424 and node upgrade logic 112 initiates a parallel upgrade of the nodes in the upgrade_pass_list in parallel, also referred to herein as an upgrade pass.

After completion of the upgrade pass, the next upgrade pass of the upgrade process may be performed using the same logic. In some embodiments, any nodes that have been upgraded are removed from the available set of nodes to be upgraded. In some embodiments, any nodes that have been upgraded may alternatively be added to the discard_list for each subsequent upgrade pass. The upgrade process may continue until all nodes have been upgraded and all upgrade passes have been completed.

In this manner, node upgrade logic 112 provides an upgrade selection process that allows for parallel or semi-parallel upgrading of the clusters and nodes of the storage array 105 by utilizing the dependencies of the nodes to determine whether an upgrade may be performed in parallel for each upgrade pass. Performing parallel upgrades during upgrade passes, where available, results in additional efficiencies in the upgrade process since the full upgrade will be performed in a shorter period of time and the nodes that are upgraded in parallel will be available for use in fewer passes.

Figure 5:
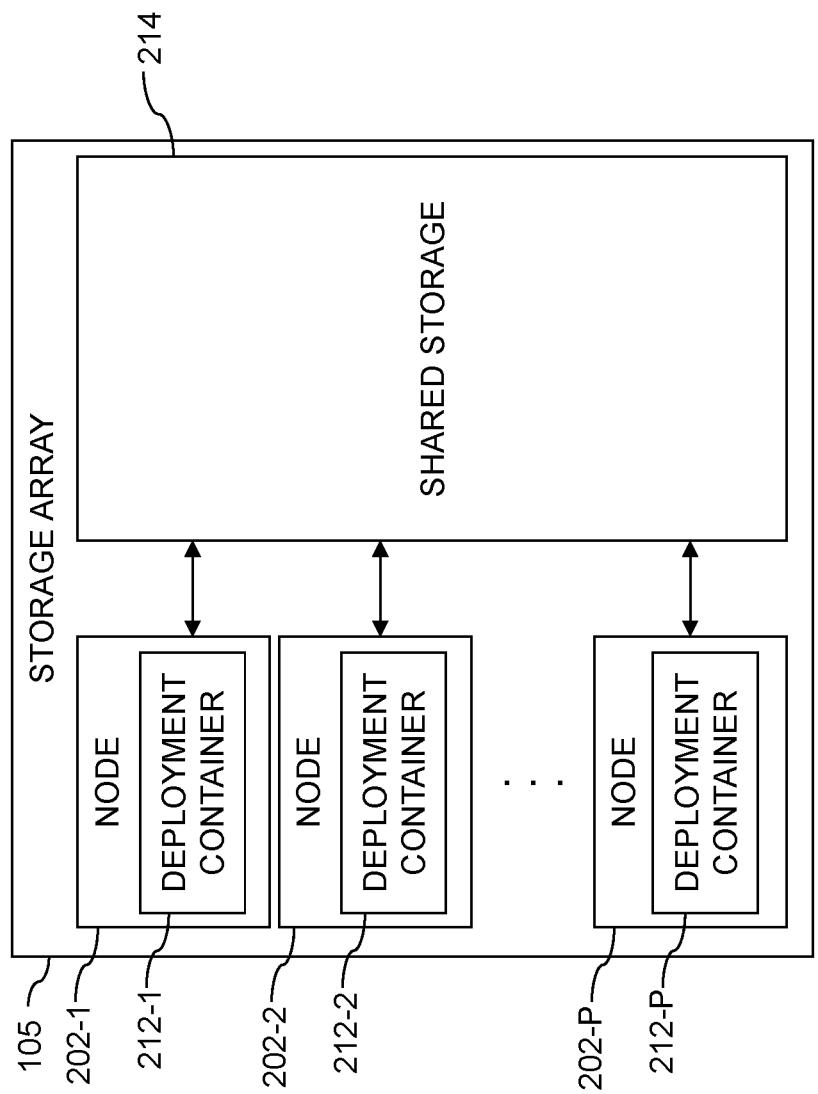
FIG. 5 is a block diagram of an example configuration of the storage array of FIG. 1 comprising a plurality of nodes having deployment containers in an illustrative embodiment.

With reference now to FIG. 5, in some embodiments, one or more of nodes 202 comprise one or more deployment containers 212. For example, as seen in FIG. 5, node 202-1 comprises a deployment container 212-1, node 202-2 comprises a deployment container 212-2 and node 202-P comprises a deployment container 212-P. While FIG. 5 illustrates one deployment container for each node 202, in illustrative embodiments, a given node may comprise multiple deployment containers 212 or no deployment containers 212. The deployment containers 212 are configured to manage the upgrade of one or more clusters 204 (FIG. 3) running on the nodes 202 of the storage array 105 as will be described in more detail below. Typically, only one of the deployment containers is set as the active deployment container for managing the upgrade of the nodes of the storage array 105 while the remaining deployment containers on the other nodes are disabled. The node hosting the active deployment container may also be referred to herein as the deployment master.

The NDU process deployment is handled through the active deployment container. The nodes of the storage array 105 are visible to the active deployment container, for example, over secure shell (SSH). External applications that request the status of NDU process can access the active deployment container through an internal networking interface to determine the status of the upgrade. In some embodiments, the deployment containers are strictly firewalled to allow only the REST queries for inbound requests.

In illustrative embodiments, to facilitate an upgrade, especially when the given node hosting the active deployment container also needs to be upgraded, an example deployment of the deployment containers 212 may comprise loading deployment containers 212 on each node 202 of the participating storage array container, e.g., deployment containers 212-1, 212-2 . . . 212-P as shown in the example of FIG. 5. In an example scenario, the deployment container 212-1 on node 202-1 is the active deployment container with the rest of the deployment containers 212, e.g., deployment containers 212-2 . . . 212-P, being offline or disabled. This ensures that the CPU and memory resources of the other nodes 202-2 . . . 202-P are not being used by the deployment containers 212-2 . . . 212-P and are instead available for other critical components in the clusters. A common shared storage 214 is also defined in the storage array 105 with node 202-1, which is running the active deployment container 212, having read-write privileges. All tasks and statuses for the upgrade process are recorded to the shared storage 214 by the active deployment container 212-1.

For each upgrade pass, the upgrade_pass_list, e.g., determined by node upgrade logic 112 as described above with reference to FIG. 4, is compared to the node hosting the active deployment container, e.g., node 202-1 in this example which may also be referred to as the first node or deployment master. If one of the nodes 202 selected to be upgraded in the upgrade_pass_list is the node hosting the active deployment container, e.g., node 202-1 hosting deployment container 212-1, node upgrade logic 112 attempts to select an already upgraded node to host the active deployment container. For example, if the upgrade pass is the second or subsequent upgrade pass, one or more nodes will have already been upgraded and node upgrade logic 112 may select one of the already upgraded nodes for hosting the active deployment container. Alternatively, if an already upgraded node does not exist, e.g., this is the first upgrade pass, node upgrade logic 112 selects a node that is not in the current upgrade_pass_list for hosting the active deployment container. For example, node upgrade logic 112 may use the discard_list to select a node that will not be upgraded in the current pass. As an example, node 202-2 may be selected.

Once a node has been selected, node upgrade logic 112 persists the configuration and state of the active deployment container, e.g., container 212-1, to the shared storage 114, and asynchronously triggers the activation of the deployment container 212-2 on the selected node 202-2 in the above example. Node upgrade logic 112 also disables the active deployment container 212-1 on the node 202-1. In some embodiments, for example, where the node upgrade logic 112 is implemented by the active deployment container 212-1, the node upgrade logic 112 may shut itself down as part of disabling the active deployment container 212-1. The node upgrade logic 112 may then resume on the deployment container 212-2 of the selected node 202-2 which now becomes the active deployment container. For example, the persisted configuration and state in the shared storage 114 may be utilized by the deployment container 212-2 on the selected node 202-2 to resume the node upgrade logic 112.

Once all of the upgrades on the original node 202-1 are complete, the deployment container 212-1 is re-activated as the active deployment container. In some embodiments, the deployment container 212-2 on the selected node 202-2 is also shut down and goes offline when the upgrades on the active node 202-1 are complete.

An example process for selecting a node for hosting the active deployment container according to the above-mentioned techniques with reference again to the set of nodes of examples A through C will now be described. As described above, the deployment container is loaded onto each of nodes 1 through 4 with the first node, node 1, initially set as the active node with the deployment containers of the rest of the nodes (i.e., nodes 2, 3 and 4) offline.

Example A: 1→{2, 3}, 2→{4}, 3→{1}, 4→{2}
  i. Active node pass 1—{2}
  ii. Active node pass 2—{1}

In example A, the first pass includes nodes 1 and 4 in the upgrade_pass_list as described above. Since node 1, the active node, is selected for upgrade in pass 1, and is also the current active node, the process instead selects and activates another node for running the deployment container. In this example, node 2 is selected although node 3 may alternatively be selected. Note that since node 4 is included in the upgrade_pass_list for pass 1, node 4 will not be selected to host the deployment container for pass 1. For pass 2, nodes 2 and 3 are now being upgraded so the process selects an already upgraded node, e.g., node 1 or node 4, as the active node for hosting the deployment container. In some embodiments, node 1 simply reverts to being the active node that hosts the deployment container after its upgrade is complete.

Example B: 1→{2, 3}, 2→{1}, 3→{1, 2}, 4→{3}
   i. Active node pass 1—{2}
   ii. Active node pass 2—{1}
   iii. Active node pass 3—{1}

In example B, the first pass includes nodes 1 and 4 in the upgrade_pass_list as described above. Since node 1, the active node, is selected for upgrade in pass 1, and is also the current active node, the process instead selects and activates another node that is not included in the upgrade_pass_list for running the deployment container. In this example, node 2 is selected although node 3 may alternatively be selected. Note that since node 4 is again included in the upgrade_pass_list for pass 1, node 4 will not be selected to host the deployment container for pass 1. For pass 2, node 2 is now being upgraded so the process selects an already upgraded node, e.g., node 1 or node 4, as the active node for hosting the deployment container. In some embodiments, node 1 simply reverts to being the active node that hosts the deployment container after its upgrade is complete. For pass 3, node 3 is now being upgraded. In pass 3, since node 1 or node 4 is already selected as the active node for hosting the deployment container, there is no need to activate another node for hosting the deployment container as neither of these nodes is currently found on the upgrade_pass_list for pass 3.

Example C: 1 →{2, 3, 4}, 2→{1, 3}, 3→{2, 4}, 4→{1, 2}
   i. Active node pass 1—{2}
   ii. Active node pass 2—{1}
   iii. Active node pass 3—{1}
   iv. Active node pass 4—{1}

In example C, the first pass includes only node 1 in the upgrade_pass_list as described above. Since node 1, the active node, is selected for upgrade in pass 1, and is also the current active node, the process instead selects and activates another node that is not included in the upgrade_pass_list for running the deployment container. In this example, node 2 is selected although nodes 3 or 4 may alternatively be selected. For pass 2, node 2 is now being upgraded so the process selects an already upgraded node, i.e., node 1, as the active node for hosting the deployment container. In some embodiments, node 1 simply reverts to being the active node that hosts the deployment container after its upgrade is complete. For pass 3, node 3 is now being upgraded. In pass 3, since node 1 is already selected as the active node for hosting the deployment container, there is no need to activate another node for hosting the deployment container as node 1 is not currently found on the upgrade_pass_list for pass 3. Likewise, for pass 4, node 4 is now being upgraded. In pass 4, since node 1 is already selected as the active node for hosting the deployment container, there is no need to activate another node for hosting the deployment container as node 1 is not currently found on the upgrade_pass_list for pass 4.

Figure 6:
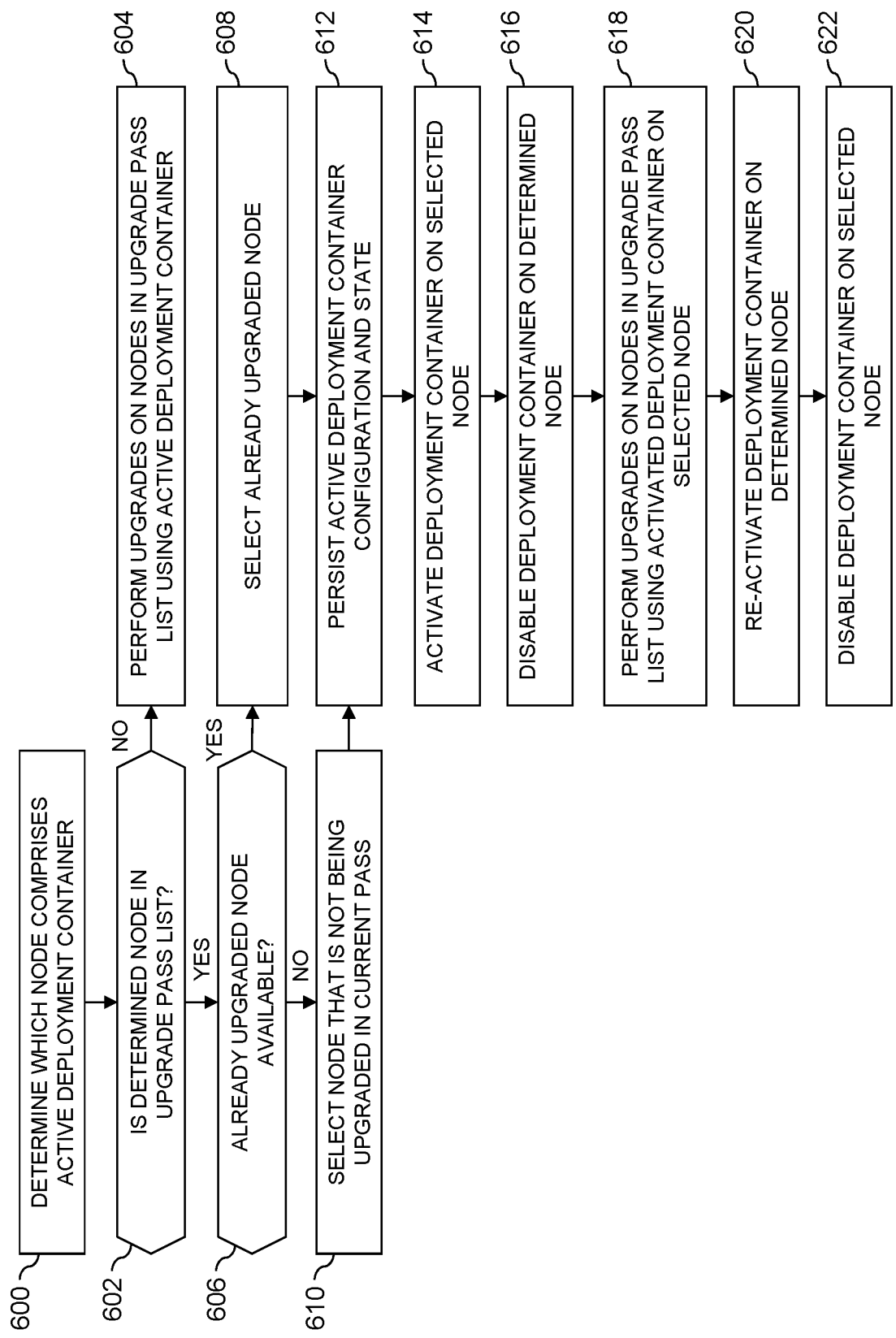
FIG. 6 is a flow diagram of an example process for the distributed deployment of an active deployment container according to node upgrade functionality in an illustrative embodiment.

The operation of node upgrade logic 112 for the active deployment container selection process will now be described in further detail with reference to the flow diagram of the illustrative embodiment of FIG. 6. The process as shown in FIG. 6 includes steps 600 through 618. The steps of FIG. 6 are illustratively performed at least in part under the control of one or more processing devices the storage array 105.

At step 600, node upgrade logic 112 determines which node comprises the active deployment container.

At step 602, node upgrade logic 112 determines whether the node that comprises the active deployment container is included in the upgrade_pass_list for the current pass. If the node is not included in the upgrade_pass_list for the current pass, node upgrade logic 112 performs upgrades on the nodes in the upgrade_pass_list using the active deployment container on the determined node at 604. If the node is included in the upgrade pass list for the current pass, the process proceeds to step 606.

At step 606, node upgrade logic 112 determines whether or not an already upgraded node is available. If an already upgraded node is available, node upgrade logic 112 selects the already upgraded node at step 608 and the process proceeds to step 612. If an already upgraded node is not available, node upgrade logic 112 selects a node that is not being upgraded in the current pass, for example, from the discard_list, at step 610 and the process proceeds to step 612.

At step 612, node upgrade logic 112 persists the configuration and state of the active deployment container on the determined node to the shared storage.

At step 614, node upgrade logic 112 activates the deployment container on the selected node.

At step 616, node upgrade logic 112 disables the deployment container on the determined node.

At step 618, node upgrade logic 112 performs upgrades on the nodes in the upgrade_pass_list using the activated deployment container on the selected node.

At step 620, following completion of the upgrade, node upgrade logic 112 re-activates the deployment container on the determined node.

At step 622, node upgrade logic 112 disables the deployment container on the selected node.

In this manner, node upgrade logic 112 provides a deployment container selection process that allows the node having an active deployment container to be upgraded as part of one of the passes without impacting the upgrade of the remaining nodes.

Generic health check procedures are often required prior to an upgrade or post upgrade. Due to the increasing size of components in storage arrays, health checks have been centralized and typically need to be executed in sequence, which impacts performance.

In illustrative embodiments, the disclosed node upgrade logic 112 implements an upgrade deployment process that may be decentralized, distributed and coupled to the components being upgraded. Because of this, the health checks for these individual components may be aware of the any connected components. Leveraging this decentralization and awareness, an example deployment of an upgrade package will now be described in more detail.

Figure 7:
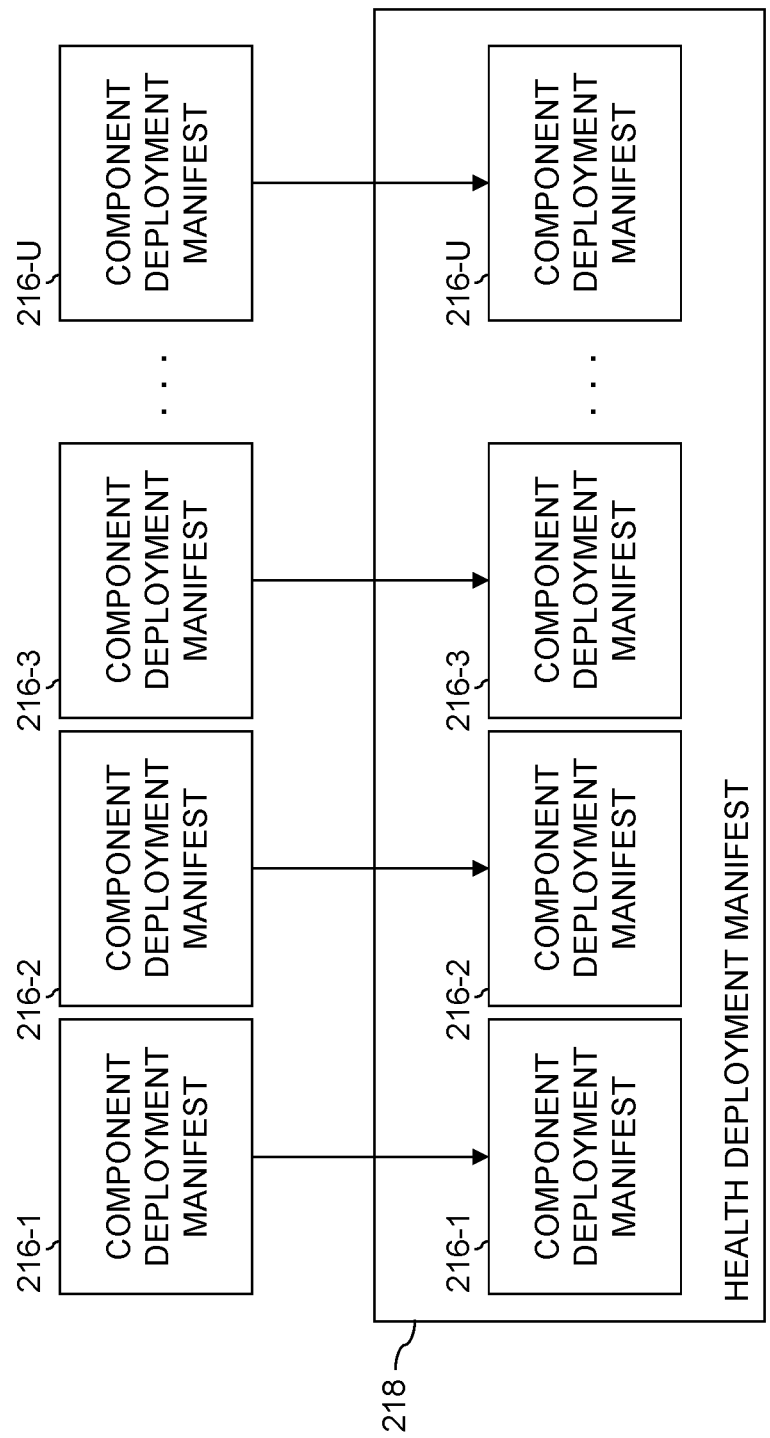
FIG. 7 is a block diagram of an example aggregation of component deployment manifests into a health deployment manifest in an illustrative embodiment.

With reference to FIG. 7, statically generated component deployment manifests 216-1, 216-2, 216-3 . . . 216-U may be available for each component in the install or upgrade deployment package. In some embodiments, a cluster level deployment manifest may also be included in the deployment package which includes health checks specific to a given cluster. Each component may be bound to the given cluster and the corresponding component deployment manifests 216 for each component may comprise one or more of the following example fields:

cluster→{name, component}
   component→{name, version, [dependency], [health], [recovery]}
   dependency→{[cluster.name|cluster.component.name] } health→{category, [command, params, condition], continue_on_error}
name→Unique string
version→A version string identifying the component version
category→A component categorization. Can be high/medium/low
command→The application/tool command to be run with absolute path
param→Parameters string that need to be passed to the command
condition→One or more conditions to check. Conditions can be of one or more of the following types:
(key <relational_operator> value), where, Relational_operators {>, ==, <, CONTAINS, EQUAL} Operators>, ==, <will be used for numerical types and string comparison will use CONTAINS and EQUAL.
Recovery→{[command, params, condition]}. Identifies all the recovery scenarios in the event the deployment of the component fails.
More than one condition can be given using 'and/or' keywords. Conditions can also be provided as a list.

While the above fields are presented as an example, any other fields may also be included in the component deployment manifests 216.

Upon initiation of an upgrade for the available package, node upgrade logic 112 collates all of the component deployment manifests 216 and any cluster level manifests and aggregates them into a single deployment manifest for health, also referred to as a health deployment manifest 218. In some embodiments, the health deployment manifest 218 may comprise the following:

Package→[clusters]

Where each component may be ordered within the cluster.

The health deployment manifest 218 holds the health check needs of each of the components and their associated components as well as any cluster level health checks. In this way, the health checks associated with any new components of a given cluster that are being upgraded and their associated components that are included or added to the deployment package will be automatically and dynamically included in the health deployment manifest 218. Components that are part of a given cluster will also tag themselves to the health checks associated with the given cluster and may also add new checks for the cluster. In some embodiments, the health deployment manifest 218 may also include dependencies to other clusters.

The health checks within the health deployment manifest 218 may be categorized and selected based on priority, e.g., high priority, medium priority, low priority, or any other categorization. For example, by default for the initial health check, all component categories having a high priority may be chosen. In the case of errors during deployment of the deployment package or to verify the health on a recovered system, all of the health checks or a predetermined portion of the health checks may be performed, irrespective of the category of the health checks. Optionally, the pre-upgrade health check can also be initiated to run a component health check for one or more categories.

Upon upgrade completion, the health deployment manifest 218 may be merged with an existing deployed manifest of a given cluster or the storage array as a whole. For example, the storage array, clusters, or nodes may have one or more deployed manifests which include all health checks that may be performed to verify the integrity of the system. After upgrade completion, the health checks associated with the upgraded components, for example, as aggregated and included in the health deployment check 218, are merged with the existing deployment manifest to upgrade the deployed manifest for testing the newly installed or upgraded components.

In some embodiments, the node upgrade logic 112 may utilize the component and cluster deployment manifests of the deployment package, or the health deployment manifest 218, to determine the list of health checks to be performed for the storage array, cluster, components or nodes during a pre-upgrade health check. For example, node upgrade logic 112 may, prior to the upgrade, determine which components, clusters or nodes of the storage array are being upgraded by the deployment package and identify a set of health checks to be performed prior to the upgrade based on the cluster and component deployment manifests, based on the health deployment manifest 218, or both, for those components, clusters or nodes. For example, rather than performing a system wide or predetermined series of health checks, the pre-upgrade health check may instead be tailored specifically to the clusters, components, nodes and their associated dependencies as defined by the health deployment manifest 218. Node upgrade logic 112 may then perform the pre-upgrade health check on the identified clusters, components, nodes and associated dependencies to verify the health of the storage array 105 for the upgrade prior to performing the upgrade.

The recovery attributes identify all of the recovery mechanisms that need to take place to bring the component to a well-known state. In some embodiments, the recovery tasks may not be added to the upgrade tasks initially and will only be added in the event of an error.

For the manifest health check process, a json-based manifest is generated for each component. Other formats for the manifest may alternatively be used. An example json-based manifest is given below:

```
{
    "cluster" : "management",
    "component". {
        "name": "esm",
        "version" : "1.0.0"
        "dependency": [ "platform.ha"]
        "health": [
            {
                "category": "high",
                "execution": [
                    {
                        "command" : "/path/cmd",
                        "param": "-param 1 -param 2",
                        "collect": [key1", "key2"],
                        "condition": [
                            "check": "key1 == value 1",
                            "check": "key2 > value2"
                        }
                    ]
                ]
                "recover": [
                    {
                        "command" : "/path/cmd",
                        "param": "-param 1 -param 2",
                        "collect": ["key1", "key2"],
                        "condition": [
                            "check": "key1 == value 1",
                            "check": "key2 > value2"
                        }
                    ]
                ]
            }
        ]
    }
}
```

As seen above, the json-based manifest comprises indications of the cluster, component name, dependencies, and at least one health check. In this example, the health check comprises a priority category of high, and health checks to be performed for after execution of the upgrade and during a recovery operation. As an example, the health check to be performed after execution of the upgrade comprises conditions to check that key1 is equal to value1 and that key2 is greater than value2. The health check to be performed during a recovery operation comprises similar conditions.

Figure 8:
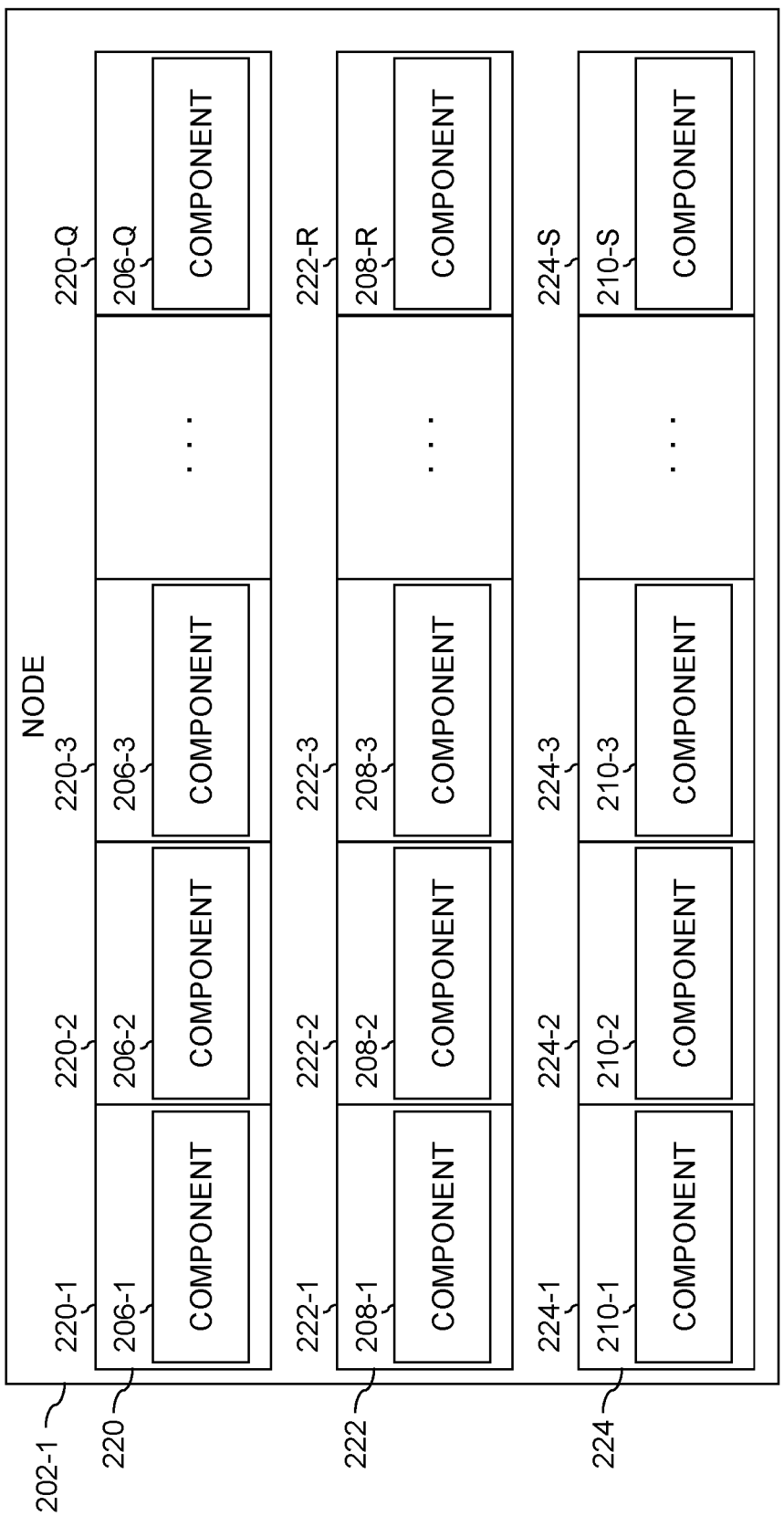
FIG. 8 is a block diagram of an example node of the storage array of FIG. 2 comprising a plurality of state machines in an illustrative embodiment.

With reference to FIGS. 3 and 8, node upgrade logic 112 may associate each component of a cluster to a state in a state machine for each node. For example, as seen in the examples of FIGS. 3 and 8, components 206-1, 206-2, 206-3 . . . 206-Q of cluster 204-1 may each be associated with a corresponding state 220-1, 220-2, 220-3 . . . 220-Q of a state machine 220 for the node 202-1, components 208-1, 208-2, 208-3 . . . 208-R of cluster 204-2 may each be associated with a corresponding state 222-1, 222-2, 222-3 . . . 222-R of a state machine 222 for the node 202-1 and components 210-1, 210-2, 210-3 . . . 210-S of cluster 204-T may each be associated with a corresponding state 224-1, 224-2, 224-3 . . . 224-S of a state machine 224 for the node 202-1. During the deployment of an upgrade for a given cluster on node 202-1, the upgrade process will start with the component corresponding to a given state in the corresponding state machine and proceeds component by component according to the state machine. Any error to a component of a cluster during the upgrade of that cluster on the given node will revert the deployment of the upgrade of that cluster to the given state of the state machine for that cluster. For example, if cluster 204-1 has components 206-1, 206-2, 206-3 . . . 206-Q which are associated with corresponding states 220-1, 220-2, 220-3 . . . 220-Q of the state machine 220, and the upgrade proceeds from component 206-1 to component 206-2, to component 206-3, and so on, on a failure during the upgrade of component 206-3, node upgrade logic 112 will revert the upgrade for cluster 204-1 to state 220-1 of state machine 220 which corresponds to component 206-1.

It is important to note that the upgrade of the components of clusters 204-2 . . . 204-T need not be interrupted or restarted due to a failure during the upgrade of a component of cluster 204-1 unless there are any dependencies between the failed component or cluster and one of the other clusters. Instead, only the upgrade of the components of cluster 204-1 is restarted using the state machine 220 while the upgrade of the components of clusters 204-2 . . . 204-T may continue as normal using their respective state machines unless such a dependency is present.

In some embodiments, each component deployment manifest may record the upgrade state of one or more of the components within the cluster. The upgrade process may also relate and connect some or all of the components within the cluster. In some cases, a recovery procedure may be performed for each component that may be initiated in response to an error. In some embodiments, it may be mandatory for the recovery procedure to complete before a restart of the upgrade after an error to a given component based on the state machine for that cluster. The overall upgrade process is independent and on failure, the upgrade may start from the failed state.

In an example scenario, there are two clusters {C1, C2} on a given node, where,

C1→{c11 . . . c1n}→Set of components in the cluster C1.
C2→{c21 . . . c2n}→Set of components in the cluster C2.

If the upgrade of component c2i, the $i^{th}$ component of cluster C2, fails on the given node, the upgrade process will recover the system to component c21 of cluster C2, which is the start of the upgrade of cluster C2. Note that the upgrade of cluster C1 will continue without interruption by the failure of component c2i on the given node as long as it does not have any dependencies to cluster C2.

In some embodiments, the overall upgrade process may include an automation that simulates the component functionality through a set of sample data after the upgrade has completed, sometimes also referred to herein as a compatibility test. For example, the automation may check the lifecycle of the control path for the component and the cluster or group of dependent clusters to ensure that the functionality is consistent. As an example, the automation may be configured:

a. To facilitate a text-based input that tests all lifecycles of the critical control operations such as, e.g., get, post, delete or other critical control operations.

b. To compile the text-based input into a test suite that contains one or more tests which are executed by a test framework. For example, the text-based input may be compiled into a json test suite.

c. To provide the text-based input with some or all of the following supporting functionality:
  i. Set the configuration (REST component, IP, Port).
  ii. Verify the get and get Instance.
  iii. Verify the post and post instance.
  iv. Verify the delete instance.

Compatibility tests comprise scripts and automation tools to simulate the functionality of a component with its dependent components on the user's storage array.

An example text-based input for the lifecycle of a cluster and filesystem such as, e.g., a NAS server is provided below:
  set type esm
  set ip 01.234.567.89
  set port 123
  post NAS_SERVER --data T'{"primaryNode":"1", "backupNode":"2", "name":"qe1"}'
  geti NAS_SERVER --id --where name=qe1
  posti storage_array --id id --data '{"accessPolicy":1}'-- where id='geti storage_array --id id --where name=qefs1'-- action modify
  deletei storage_array --id id --where id='geti storage_array --id id --where
  name=qefs1'
  save a.json An example compiled json translation of the example text-based input is provided below:

```
{
  "execute": [
    {
      "dependency": {},
      "hrefcommand":
"https: //01.234.567.89:123/api/rest/types/NAS SERVER/instances",
      "operations": [
        "post"
      ],
```

-continued

```
            "post": {
                "request": {
                        "backupNode": "2",
                        "name": "qe1",
                        "primaryNode": "1"
                },
                "response": {}
            },
            "priority": 100
        }
    ]
},
{
    "execute": [
        {
            "dependency": {
                "0ff6ca2e-74c6-40ef-aff6-e3d020cf8e02:id": ":collect:id"
            },
            "get": {
                "request": {}
                "response": {
                    ":collect": "id",
                    ":key": "name",
                    "name": "qe1"
                }
            },
            "hrefcommand":
"https://01.234.567.89:123/api/rest/Opes/NAS SERVER/instances",
            "operations": [
                "get"
            ],
            "priority": 200
        },
        {
            "dependency": {}
            "get": {
                "request": {
                    ":instance": "0ff6ca2e-74c6-40ef-aff6-e3d020cf8e02:id"
                },
                "response": {}
            },
            "hrefcommand":
"https://01.234.567.89:123/api/rest/instances/NAS SERVER/:instance",
            "operations": [
                "get"
            ],
            "priority": 300
        }
    ]
},
{
    "execute": [
        {
            "dependency": {
                "941eaf74-c777-4441-8714-e728183539da:id": ":collect:id"
            },
            "get": {
                "request": {}
                "response": {
                    ":collect": "id",
                    ":key": "name",
                    "name": "qefs1"
                }
            },
            "hrefcommand":
"https://01.234.567.89:123/api/rest/Opes/storage array/instances",
            "operations": [
                "get"
            ],
            "priority": 300
        },
        {
            "dependency": {},
            "get": {
                "request": {
                    ":instance": "941eaf74-c777-4441-8714-e728183539da:id"
                },
                "response": {}
            },
```

```
            "hrefcommand":
"https://01.234.567.89:123/api/rest/instances/storage array/:instance",
            "operations": [
                "get"
            ],
            "priority": 400
        },
        {
            "dependency": {},
            "hrefcommand":
"https://01.234. 567.89: 123/api/rest/instances/storage array/:instance/action/modift",
            "operations": [
                "post"
            ],
            "post": {
                "request": {
                    ":instance":          "941eaf74-c777-4441-8714-e728183539da:
id",
                    "accessPolicy": 1
                },
                "response": {}
            },
            "priority": 500
        }
    ]
}
{
    "execute": [
        {
            "dependency": {
                "e7815394-7d0c-47fb-902a-70c176bc731flid": ":collect:id"
            },
            "get": {
                "request": {},
                "response": {
                    ":collect": "id",
                    ":key": "name",
                    "name": "qefs1"
                }
            },
            "hrefcommand":
"https://01.234.567.89:123/api/rest/Opes/storage array/instances",
            "operations": [
                "get"
            ],
            "priority": 300
        },
        {
            "dependency": {},
            "get": {
                "request": {
                    ":instance": "e7815394-7d0c-47fb-902a-70c176bc731flid"
                },
                "response": {}
            },
            "hrefcommand":
"https://01.234.567.89:123/api/rest/instances/storage array/:instance",
            "operations": [
                "get"
            ],
            "priority": 400
        },
        {
            "delete": {
                "request": {
                    ":instance": "e7815394-7d0c-47fb-902a-70c176bc731flid"
                },
                "response": {}
            },
            "dependency": {},
            "hrefcommand":
"https://01.234.567.89: 123/api/rest/instances/storage array/:instance",
            "operations": [
                "delete"
            ],
            "priority": 500
        }
    ]
}
```

In some embodiments, the following information may be recorded as a test output:
 a. The success or failure of the test.
 b. The time it took to complete each test.
 c. The overall log of the test.

Each of the above described embodiments provide techniques which alone or in combination increase the efficiency in the upgrade process for components of clusters on nodes of a storage array.

For example, by implementing a semi-parallel upgrade process, multiple non-dependent nodes may be upgraded in parallel while dependent nodes may be upgraded in serial in an order which requires the smallest number of passes.

By implementing a process for distributing the active node that hosts the deployment container based on which nodes are being upgraded for each pass, the storage array may continue to function during an upgrade instead of requiring a system shutdown to perform the upgrade on all of the nodes.

As another example, by implementing an adaptive health check which takes into account which components were actually upgraded and their corresponding dependencies, the disclosed techniques improve efficiency of the storage array by reducing the resource usage required to perform the health checks both before and after an upgrade.

By implementing cluster level recovery when an error occurs during a component upgrade for a particular cluster and only recovering the upgrade for that cluster based on a cluster specific state machine while allowing the other clusters to continue with the upgrade process, the usage of system resources may be reduced in response to an error.

The implementation of the above described automation and compatibility check provides an assurance that the storage array functions as expected post upgrade by testing it with a sample set of data to ensure that the lifecycle of the control path and other functionality are consistent with the pre-upgrade storage array.

It is to be understood that for any methodologies described herein, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes for different storage systems.

Functionality such as that described herein can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a host device such as host device 102 or a storage controller such as storage controller 108 that is configured to control performance of one or more steps described herein can be implemented as part of what is more generally referred to herein as a processing platform comprising one or more processing devices each comprising a processor coupled to a memory. Such processing devices are to be distinguished from processing devices referred to herein with respect to the processing capabilities of the SSDs. In the case of a host device or storage controller, a given such processing device may correspond to one or more virtual machines or other types of virtualization infrastructure such as Docker containers or Linux containers (LXCs). The host device 102 or the storage controller 108, as well as other system components, may be implemented at least in part using processing devices of such processing platforms. For example, in a distributed implementation of the storage controller 108, respective distributed modules of such a storage controller can be implemented in respective containers running on respective ones of the processing devices of a processing platform.

In some embodiments, the storage system comprises an XtremIO™ storage array or other type of content addressable storage system suitably modified to incorporate the node upgrade functionality as disclosed herein.

An illustrative embodiment of such a content addressable storage system will now be described with reference to FIG. 9. In this embodiment, a content addressable storage system 905 comprises a plurality of storage devices 906 and an associated storage controller 908. The content addressable storage system 905 may be viewed as a particular implementation of the storage system 105, and accordingly is assumed to be coupled to host devices 102 of computer system 101 via network 104 within information processing system 100.

The storage controller 908 in the present embodiment is configured to implement node upgrade functionality of the type previously described in conjunction with FIGS. 1-3. For example, the storage controller 908 includes node upgrade logic 914 which is configured to operate in a manner similar to that described above for node upgrade logic 112.

The storage controller 908 includes one or more processing devices each comprising a plurality of cores, which are configured to operate in a manner similar to that described above for implementing node upgrade functionality by storage controller 108.

Figure 9:
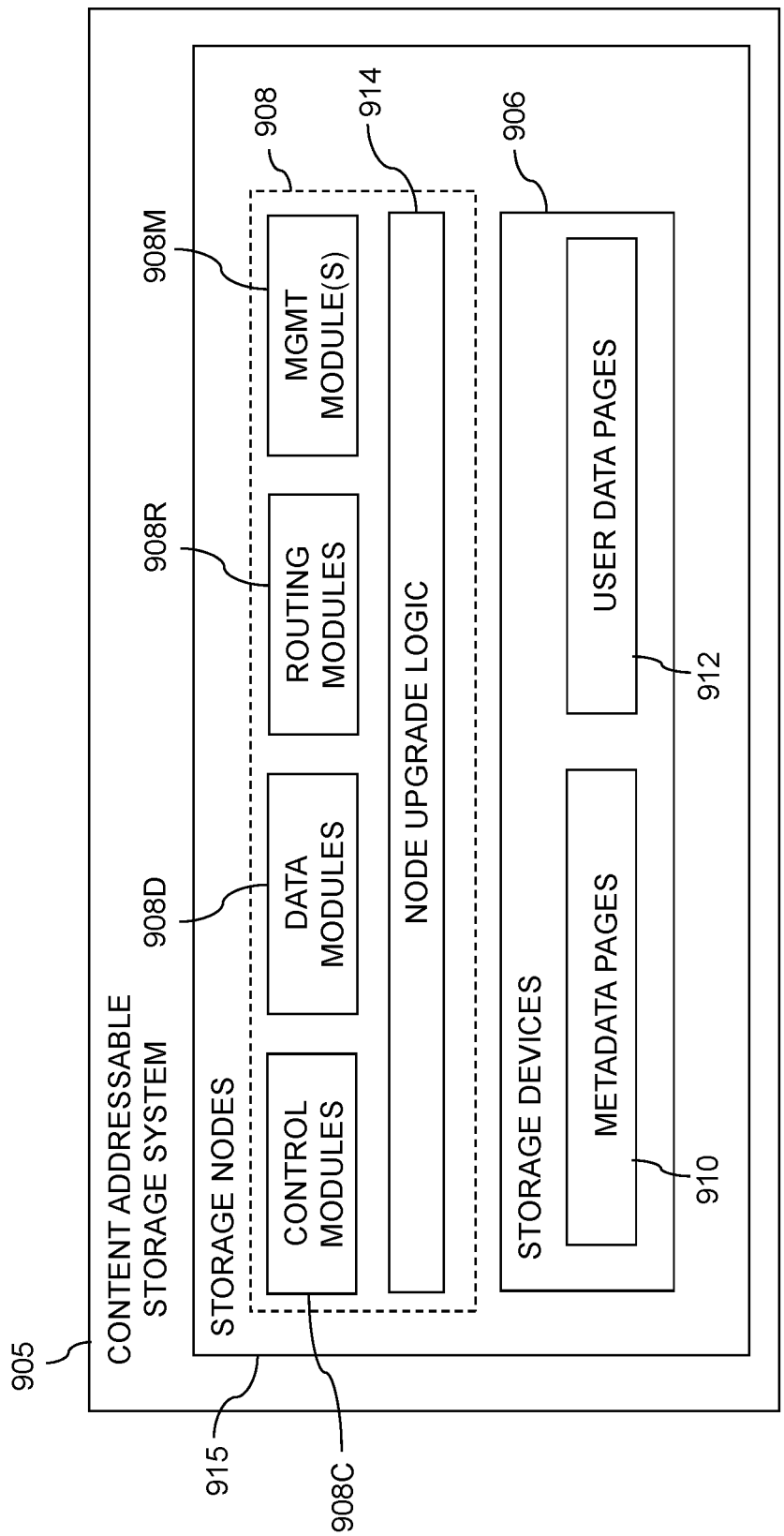
FIG. 9 shows a content addressable storage system having a distributed storage controller configured for implementing the node upgrade functionality in an illustrative embodiment.

The content addressable storage system 905 in the FIG. 9 embodiment is implemented as at least a portion of a clustered storage system and includes a plurality of storage nodes 915 each comprising a corresponding subset of the storage devices 906. Other clustered storage system arrangements comprising multiple storage nodes can be used in other embodiments. A given clustered storage system may include not only storage nodes 915 but also additional storage nodes coupled to network 104. Alternatively, such additional storage nodes may be part of another clustered storage system of the system 100. Each of the storage nodes 915 of the storage system 905 is assumed to be implemented using at least one processing device comprising a processor coupled to a memory.

The storage controller 908 of the content addressable storage system 905 is implemented in a distributed manner so as to comprise a plurality of distributed storage controller components implemented on respective ones of the storage nodes 915. The storage controller 908 is therefore an example of what is more generally referred to herein as a "distributed storage controller." In subsequent description herein, the storage controller 908 may be more particularly referred to as a distributed storage controller.

Each of the storage nodes 915 in this embodiment further comprises a set of processing modules configured to communicate over one or more networks with corresponding sets of processing modules on other ones of the storage nodes 915. The sets of processing modules of the storage nodes 915 collectively comprise at least a portion of the distributed storage controller 908 of the content addressable storage system 905.

The modules of the distributed storage controller 908 in the present embodiment more particularly comprise different sets of processing modules implemented on each of the storage nodes 915. The set of processing modules of each of the storage nodes 915 comprises at least a control module 908C, a data module 908D and a routing module 908R. The distributed storage controller 908 further comprises one or more management ("MGMT") modules 908M. For example, only a single one of the storage nodes 915 may include a management module 908M. It is also possible that management modules 908M may be implemented on each of at least a subset of the storage nodes 915.

Each of the storage nodes 915 of the storage system 905 therefore comprises a set of processing modules configured to communicate over one or more networks with corresponding sets of processing modules on other ones of the storage nodes. A given such set of processing modules implemented on a particular storage node illustratively includes at least one control module 908C, at least one data module 908D and at least one routing module 908R, and possibly a management module 908M. These sets of processing modules of the storage nodes collectively comprise at least a portion of the distributed storage controller 908.

Communication links may be established between the various processing modules of the distributed storage controller 908 using well-known communication protocols such as IP, Transmission Control Protocol (TCP), and remote direct memory access (RDMA). For example, respective sets of IP links used in data transfer and corresponding messaging could be associated with respective different ones of the routing modules 908R.

The storage devices 906 are configured to store metadata pages 910 and user data pages 912 and may also store additional information not explicitly shown such as checkpoints and write journals. The metadata pages 910 and the user data pages 912 are illustratively stored in respective designated metadata and user data areas of the storage devices 906. Accordingly, metadata pages 910 and user data pages 912 may be viewed as corresponding to respective designated metadata and user data areas of the storage devices 906.

A given "page" as the term is broadly used herein should not be viewed as being limited to any particular range of fixed sizes. In some embodiments, a page size of 8-KB is used, but this is by way of example only and can be varied in other embodiments. For example, page sizes of 4-KB, 16-KB or other values can be used. Accordingly, illustrative embodiments can utilize any of a wide variety of alternative paging arrangements for organizing the metadata pages 910 and the user data pages 912.

The user data pages 912 are part of a plurality of logical units (LUNs) or other storage volumes that are configured to store files, blocks, objects or other arrangements of data, each also generally referred to herein as a "data item," on behalf of users associated with host devices 102. Each such LUN may comprise particular ones of the above-noted pages of the user data area. The user data stored in the user data pages 912 can include any type of user data that may be utilized in the system 100. The term "user data" herein is therefore also intended to be broadly construed.

The content addressable storage system 905 in the embodiment of FIG. 9 is configured to generate hash metadata providing a mapping between content-based digests of respective ones of the user data pages 912 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 912. The hash metadata generated by the content addressable storage system 905 is illustratively stored as metadata pages 910 in the metadata area. The generation and storage of the hash metadata is assumed to be performed under the control of the storage controller 908.

Each of the metadata pages 910 characterizes a plurality of the user data pages 912. For example, a given set of user data pages representing a portion of the user data pages 912 illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include the above-noted SHA1 hash function, or other secure hashing algorithms known to those skilled in the art. The content-based signature is utilized to determine the location of the corresponding user data page within the user data area of the storage devices 906.

Each of the metadata pages 910 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 910 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 905 is illustratively distributed among the control modules 908C.

In some embodiments, the content addressable storage system 905 comprises an XtremIO™ storage array suitably modified to incorporate the above described node upgrade functionality.

In arrangements of this type, the control modules 908C, data modules 908D and routing modules 908R of the distributed storage controller 908 illustratively comprise respective C-modules, D-modules and R-modules of the XtremIO™ storage array. The one or more management modules 908M of the distributed storage controller 908 in such arrangements illustratively comprise a system-wide management module ("SYM module") of the XtremIO™ storage array, although other types and arrangements of system-wide management modules can be used in other embodiments. Accordingly, node upgrade functionality in some embodiments is implemented under the control of at least one system-wide management module of the distributed storage controller 908, utilizing the C-modules, D-modules and R-modules of the XtremIO™ storage array.

In the above-described XtremIO™ storage array example, each user data page has a fixed size such as 8-KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein in their entirety.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 908C such that control of the slices within the storage controller 908 of the storage system 905 is substantially evenly distributed over the control modules 908C of the storage controller 908.

The D-module allows a user to locate a given user data page based on its signature. Each metadata page also has a size of 8-KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 905 each illustratively comprise one or more IO operations directing that at least one data item of the storage system 905 be written to in a particular manner. A given write request is illustratively received in the storage system 905 from a host device, illustratively one of the host devices 102. In some embodiments, a write request is received in the distributed storage controller 908 of the storage system 905 and directed from one processing module to another processing module of the distributed storage controller 908. For example, a received write request may be directed from a routing module 908R of the distributed storage controller 908 to a particular control module 908C of the distributed storage controller 908. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 915 communicate with one another over a high-speed internal network such as an InfiniBand network. The C-modules, D-modules and R-modules coordinate with one another to accomplish various IO processing tasks.

The write requests from the host devices identify particular data pages to be written in the storage system 905 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 905 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the storage system 905.

The first level of mapping using the A2H table associates logical addresses of respective data pages with respective content-based signatures of those data pages. This is also referred to logical layer mapping.

The second level of mapping using the HMD table associates respective ones of the content-based signatures with respective physical storage locations in one or more of the storage devices 906. This is also referred to as physical layer mapping.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

The logical block addresses or LBAs of a logical layer of the storage system 905 correspond to respective physical blocks of a physical layer of the storage system 905. The user data pages of the logical layer are organized by LBA and have reference via respective content-based signatures to particular physical blocks of the physical layer.

Each of the physical blocks has an associated reference count that is maintained within the storage system 905. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 908C, 908D, 908R and 908M as shown in the FIG. 9 embodiment is presented by way of example only. Numerous alternative arrangements of processing modules of a distributed storage controller may be used to implement node upgrade functionality in other embodiments.

Additional examples of content addressable storage functionality implemented in some embodiments by control modules 908C, data modules 908D, routing modules 908R and management module(s) 908M of distributed storage controller 908 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with node upgrade functionality will now be described in greater detail with reference to FIGS. 10 and 11. Although described in the context of system 100, these platforms may also be used to implement at least portions of other information processing systems in other embodiments.

Figure 10:
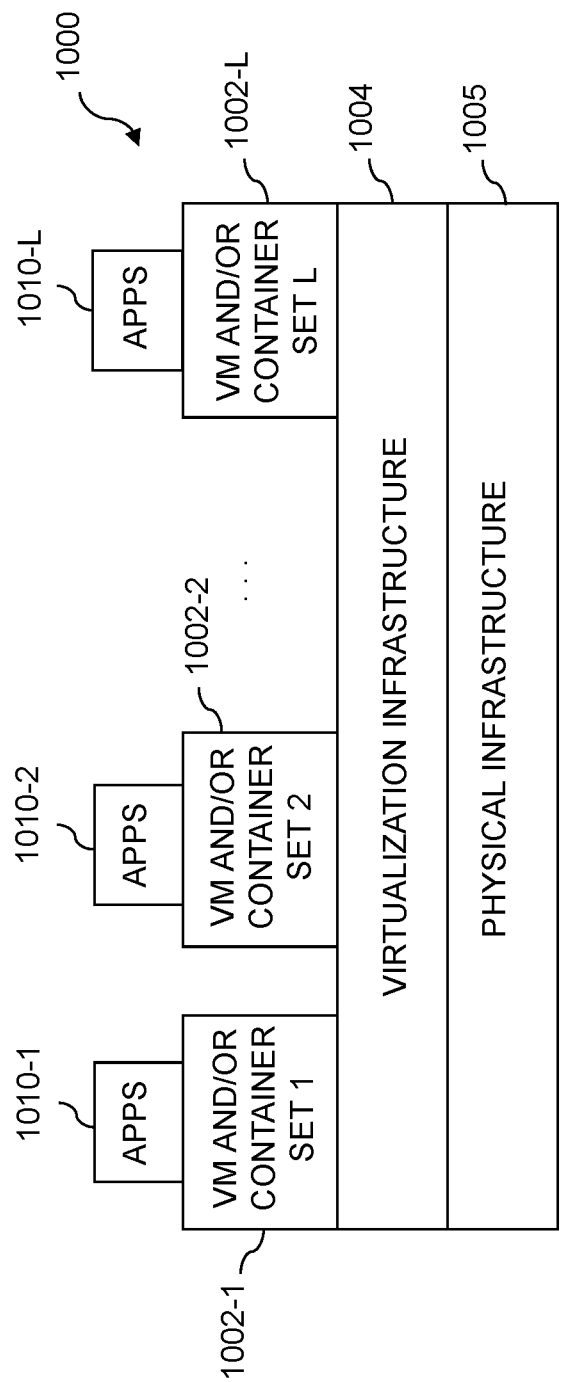
FIGS. 10 and 11 show examples of processing platforms that may be utilized to implement at least a portion of an information processing system in illustrative embodiments.
Figure 11:
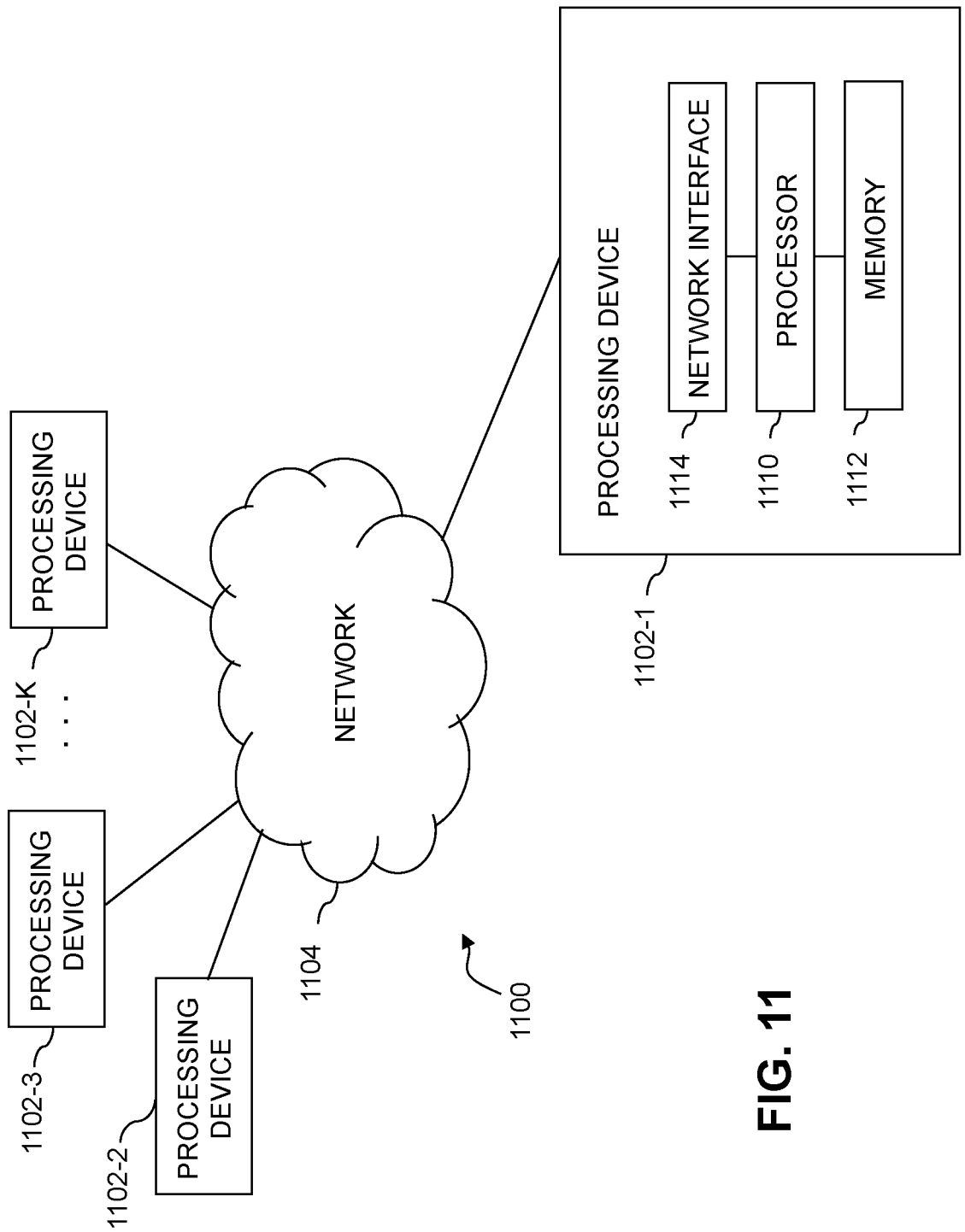

FIG. 10 shows an example processing platform comprising cloud infrastructure 1000. The cloud infrastructure 1000 comprises a combination of physical and virtual processing resources that may be utilized to implement at least a portion of the information processing system 100. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. Such implementations can provide node upgrade functionality of the type described above for one or more processes running on a given one of the VMs. For example, each of the VMs can implement node upgrade functionality in the system 100.

An example of a hypervisor platform that may be used to implement a hypervisor within the virtualization infrastructure 1004 is the VMware® vSphere® which may have an associated virtual infrastructure management system such as the VMware® vCenter™. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system. Such implementations can also provide node upgrade functionality of the type described above. For example, a container host device supporting multiple containers of one or more container sets can implement one or more cores executing the node upgrade functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112.

The processor 1110 may comprise a microprocessor, a microcontroller, an application-specific integrated circuit (ASIC), a field-programmable gate array (FPGA) or other type of processing circuitry, as well as portions or combinations of such circuitry elements.

The memory 1112 may comprise random access memory (RAM), read-only memory (ROM), flash memory or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the node upgrade functionality of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, system managers, and node upgrade logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising at least one processing device comprising a processor coupled to a memory, the at least one processing device configured:
    to identify a first subset of nodes in a plurality of nodes of a storage system, the first subset of nodes comprising nodes having dependencies with a first node in the plurality of nodes;
    to identify a second subset of nodes in the plurality of nodes, the second subset of nodes comprising nodes having dependencies with a second node in the plurality of nodes;
    to select the first node for an upgrade;
    to determine that the second node is not included in the first subset of nodes;
    to determine that the first node is not included in the second subset of nodes; and
    to upgrade the first and second nodes at least partially in parallel based at least in part on the determination that the second node is not included in the first subset of nodes and the determination that the first node is not included in the second subset of nodes;
    wherein prior to upgrading the first node, the at least one processing device is further configured:
        to determine that the first node comprises an active deployment container that is configured to manage upgrades for at least a subset of the plurality of nodes;
        to determine that the first node was selected for the upgrade;
        to identify a given node of the plurality of nodes that is not selected for the upgrade;
        to activate a deployment container on the given node; and
        to disable the deployment container on the first node;
    wherein after the upgrade of the first node is complete, the at least one processing device is further configured:
        to activate the deployment container on the first node; and
        to disable the deployment container on the given node.

2. The apparatus of claim 1 wherein the at least one processing device is further configured:
    to identify a third subset of nodes in the plurality of nodes, the third subset of nodes comprising nodes having dependencies with a third node in the plurality of nodes;
    to identify a fourth subset of nodes in the plurality of nodes, the fourth subset of nodes comprising nodes having dependencies with a fourth node in the plurality of nodes;

to select the third node for an upgrade, the first subset of nodes comprising the third node;

to determine that the fourth node is not included in the third subset of nodes;

to determine that the third node is not included in the fourth subset of nodes; and to upgrade the third and fourth nodes at least partially in parallel based at least in part on the determination that the fourth node is not included in the third subset of nodes and the determination that the third node is not included in the fourth subset of nodes, wherein the upgrading of the third and fourth nodes is performed asynchronously with the upgrading of the first and second nodes.

3. The apparatus of claim 1 wherein identifying the given node of the plurality of nodes that is not selected for the upgrade comprises one of determining that the given node has already been upgraded and determining that the given node is included in the first subset of nodes as a node that has a dependency with the first node.

4. The apparatus of claim 1 wherein the upgrading is performed based at least in part on an upgrade package comprising a plurality of components to be upgraded and wherein the at least one processing device is further configured:

to obtain a plurality of deployment manifests associated with the plurality of components, each deployment manifest comprising an indication of at least one health check associated with a corresponding component to be performed as part of the upgrade;

to aggregate the obtained deployment manifests into a health deployment manifest, the health deployment manifest comprising a combined list of health checks based at least in part on the indication included in each deployment manifest; and to perform at least one health check based at least in part on the health deployment manifest.

5. The apparatus of claim 4 wherein the list of health checks comprises a priority level for each health check and wherein performing the at least one health check based at least in part on the health deployment manifest comprises performing at least one health check having a given priority level in the list of health checks.

6. The apparatus of claim 5 wherein, responsive to an occurrence of an error during the upgrade, the at least one processing device is further configured to perform one or more of:

at least one additional health check having a different priority level than the given priority level in the list of health checks; and at least one additional health check that is not included in the list of health checks.

7. The apparatus of claim 1 wherein a given node in the plurality of nodes is configured to service a plurality of clusters and wherein the at least one processing device is further configured:

to associate each of the clusters with a separate state machine for the given node, each state in the state machine associated with a given cluster corresponding to a component to be upgraded on the given node for that cluster;

responsive to a detection of an error during an upgrade of a component of the given cluster on the given node, to revert the upgrade of the given cluster to a predetermined component of the given cluster based at least in part on the state machine associated with the given cluster; and to restart the upgrade of the given cluster on the given node from the predetermined component of the given cluster.

8. A method comprising:

identifying a first subset of nodes in a plurality of nodes of a storage system, the first subset of nodes comprising nodes having dependencies with a first node in the plurality of nodes;

identifying a second subset of nodes in the plurality of nodes, the second subset of nodes comprising nodes having dependencies with a second node in the plurality of nodes;

selecting the first node for an upgrade;

determining that the second node is not included in the first subset of nodes;

determining that the first node is not included in the second subset of nodes; and upgrading the first and second nodes at least partially in parallel based at least in part on the determination that the second node is not included in the first subset of nodes and the determination that the first node is not included in the second subset of nodes;

wherein prior to upgrading the first node, the method further comprises:

determining that the first node comprises an active deployment container that is configured to manage upgrades for at least a subset of the plurality of nodes;

determining that the first node was selected for the upgrade;

identifying a given node of the plurality of nodes that is not selected for the upgrade;

activating a deployment container on the given node; and disabling the deployment container on the first node; and wherein after the upgrade of the first node is complete, the method further comprises:

activating the deployment container on the first node; and disabling the deployment container on the given node;

wherein the method is implemented by at least one processing device of the storage system, the at least one processing device comprising a processor coupled to memory.

9. The method of claim 8 wherein the method further comprises:

identifying a third subset of nodes in the plurality of nodes, the third subset of nodes comprising nodes having dependencies with a third node in the plurality of nodes;

identifying a fourth subset of nodes in the plurality of nodes, the fourth subset of nodes comprising nodes having dependencies with a fourth node in the plurality of nodes;

selecting the third node for an upgrade, the first subset of nodes comprising the third node;

determining that the fourth node is not included in the third subset of nodes;

determining that the third node is not included in the fourth subset of nodes; and upgrading the third and fourth nodes at least partially in parallel based at least in part on the determination that the fourth node is not included in the third subset of nodes and the determination that the third node is not included in the fourth subset of nodes, wherein the upgrading of the third and fourth nodes is performed asynchronously with the upgrading of the first and second nodes.

10. The method of claim 8 wherein identifying the given node of the plurality of nodes that is not selected for the upgrade comprises one of determining that the given node has already been upgraded and determining that the given node is included in the first subset of nodes as a node that has a dependency with the first node.

11. The method of claim 8 wherein the upgrading is performed based at least in part on an upgrade package comprising a plurality of components to be upgraded and wherein the method further comprises:

obtaining a plurality of deployment manifests associated with the plurality of components, each deployment manifest comprising an indication of at least one health check associated with a corresponding component to be performed as part of the upgrade;

aggregating the obtained deployment manifests into a health deployment manifest, the health deployment manifest comprising a combined list of health checks based at least in part on the indication included in each deployment manifest; and performing at least one health check based at least in part on the health deployment manifest.

12. The method of claim 11 wherein the list of health checks comprises a priority level for each health check and wherein performing the at least one health check based at least in part on the health deployment manifest comprises performing at least one health check having a given priority level in the list of health checks.

13. The method of claim 12 wherein, responsive to an occurrence of an error during the upgrade, the method further comprises performing one or more of:

at least one additional health check having a different priority level than the given priority level in the list of health checks; and at least one additional health check that is not included in the list of health checks.

14. The method of claim 8 wherein a given node in the plurality of nodes is configured to service a plurality of clusters and wherein the method further comprises:

associating each of the clusters with a separate state machine for the given node, each state in the state machine associated with a given cluster corresponding to a component to be upgraded on the given node for that cluster;

responsive to a detection of an error during an upgrade of a component of the given cluster on the given node, reverting the upgrade of the given cluster to a predetermined component of the given cluster based at least in part on the state machine associated with the given cluster; and restarting the upgrade of the given cluster on the given node from the predetermined component of the given cluster.

15. A computer program product comprising a non-transitory processor-readable storage medium having stored therein program code of one or more software programs, wherein the program code when executed by at least one processing device of a storage system, the at least one processing device comprising a processor coupled to a memory, causes the at least one processing device:

to identify a first subset of nodes in a plurality of nodes of the storage system, the first subset of nodes comprising nodes having dependencies with a first node in the plurality of nodes;

to identify a second subset of nodes in the plurality of nodes, the second subset of nodes comprising nodes having dependencies with a second node in the plurality of nodes;

to select the first node for an upgrade;

to determine that the second node is not included in the first subset of nodes;

to determine that the first node is not included in the second subset of nodes; and to upgrade the first and second nodes at least partially in parallel based at least in part on the determination that the second node is not included in the first subset of nodes and the determination that the first node is not included in the second subset of nodes;

wherein prior to upgrading the first node, the program code further causes the at least one processing device:

to determine that the first node comprises an active deployment container that is configured to manage upgrades for at least a subset of the plurality of nodes;

to determine that the first node was selected for the upgrade;

to identify a given node of the plurality of nodes that is not selected for the upgrade;

to activate a deployment container on the given node; and to disable the deployment container on the first node;

wherein after the upgrade of the first node is complete, the program code further causes the at least one processing device:

to activate the deployment container on the first node; and to disable the deployment container on the given node.

16. The computer program product of claim 15 wherein identifying the given node of the plurality of nodes that is not selected for the upgrade comprises one of determining that the given node has already been upgraded and determining that the given node is included in the first subset of nodes as a node that has a dependency with the first node.

17. The computer program product of claim 15 wherein the upgrading is performed based at least in part on an upgrade package comprising a plurality of components to be upgraded and wherein the program code further causes the at least one processing device:

to obtain a plurality of deployment manifests associated with the plurality of components, each deployment manifest comprising an indication of at least one health check associated with a corresponding component to be performed as part of the upgrade;

to aggregate the obtained deployment manifests into a health deployment manifest, the health deployment manifest comprising a combined list of health checks based at least in part on the indication included in each deployment manifest; and to perform at least one health check based at least in part on the health deployment manifest.

18. The computer program product of claim 17 wherein the list of health checks comprises a priority level for each health check and wherein performing the at least one health check based at least in part on the health deployment manifest comprises performing at least one health check having a given priority level in the list of health checks.

19. The computer program product of claim 18 wherein, responsive to an occurrence of an error during the upgrade, the program code further causes the at least one processing device to perform one or more of:

at least one additional health check having a different priority level than the given priority level in the list of health checks; and at least one additional health check that is not included in the list of health checks.

20. The computer program product of claim 15 wherein a given node in the plurality of nodes is configured to service a plurality of clusters and wherein the program code further causes the at least one processing device:

to associate each of the clusters with a separate state machine for the given node, each state in the state machine associated with a given cluster corresponding to a component to be upgraded on the given node for that cluster;

responsive to a detection of an error during an upgrade of a component of the given cluster on the given node, to revert the upgrade of the given cluster to a predetermined component of the given cluster based at least in part on the state machine associated with the given cluster; and to restart the upgrade of the given cluster on the given node from the predetermined component of the given cluster.

* * * * *